United States Patent
Yoshita et al.

(10) Patent No.: US 10,116,834 B2
(45) Date of Patent: Oct. 30, 2018

(54) IMAGE READING APPARATUS AND METHOD, WITH A MOVABLE LIGHT REFLECTING SURFACE

(71) Applicant: PFU LIMITED, Kahoku-shi, Ishikawa (JP)

(72) Inventors: Shogo Yoshita, Kahoku (JP); Wataru Tamura, Kahoku (JP)

(73) Assignee: PFU LIMITED, Kahoku-Shi, Ishikawa (JP)

( * ) Notice: Subject to any disclaimer, the term of this patent is extended or adjusted under 35 U.S.C. 154(b) by 0 days.

(21) Appl. No.: 15/174,898

(22) Filed: Jun. 6, 2016

(65) Prior Publication Data
US 2017/0142289 A1    May 18, 2017

(30) Foreign Application Priority Data

Nov. 18, 2015 (JP) .................................. 2015-225777

(51) Int. Cl.
H04N 1/40 (2006.01)
H04N 1/028 (2006.01)
H04N 1/193 (2006.01)

(52) U.S. Cl.
CPC ..... *H04N 1/40056* (2013.01); *H04N 1/02815* (2013.01); *H04N 1/193* (2013.01); *H04N 2201/0081* (2013.01)

(58) Field of Classification Search
None
See application file for complete search history.

(56) References Cited

U.S. PATENT DOCUMENTS

| 6,494,374 B1* | 12/2002 | Wang ................. H04N 1/00681 235/459 |
| 2007/0223062 A1* | 9/2007 | Tanaka ..................... H04N 1/03 358/497 |
| 2014/0022605 A1* | 1/2014 | Shimizu ............. H04N 1/00896 358/449 |
| 2014/0168729 A1 | 6/2014 | Ikeda |

FOREIGN PATENT DOCUMENTS

| CN | 1783937 A | 6/2006 |
| CN | 102055867 A | 5/2011 |
| JP | 2014-72821 A | 4/2014 |
| JP | 2014-120785 A | 6/2014 |

OTHER PUBLICATIONS

Chinese Office Action dated Jun. 12, 2018 regarding Chinese Patent Application No. 20160607214.4 corresponding to U.S. Appl. No. 15/174,898 (10 pages) with English Translation (14 pages).

* cited by examiner

*Primary Examiner* — Lennin RodriguezGonzalez
(74) *Attorney, Agent, or Firm* — Lewis Roca Rothgerber Christie LLP

(57) ABSTRACT

An image reading apparatus includes an image capturing module for capturing an image of a document, a light source, a movable light reflecting surface having a white color, a driving module for moving the light reflecting surface into a first position at which the light reflecting surface reflects light from the light source and a second position at which the light reflecting surface does not reflect light from the light source, and a control module for controlling the driving module to move the light reflecting surface. The control module determines the second position by moving the light reflecting surface by a predetermined quantity from the first position determined based on an image obtained by the image capturing module.

9 Claims, 14 Drawing Sheets

IMAGE READING APPARATUS AND METHOD, WITH A MOVABLE LIGHT REFLECTING SURFACE

CROSS-REFERENCE TO RELATED APPLICATIONS

This application is based upon and claims the benefit of priority of prior Japanese Patent Application No. 2015-225777, filed on Nov. 18, 2015, the entire contents of which are incorporated herein by reference.

TECHNICAL FIELD

Embodiments discussed in the present specification relate to controlling moving a light reflecting surface.

BACKGROUND

In general, an image reading apparatus such as a scanner has a backing at a position facing an image capturing device capturing an image of a document, and switches the position of the backing to change the background color of the document to white color or black color. The image reading apparatus drives the motor to pivot the backing to switch the position of the backing. Several methods are known as the method for setting the backing to a predetermined position.

For example, an image reading apparatus includes a position sensor for detecting the position of a backing, and when a position sensor detects the backing having moved to the predetermined position, the driving of the motor is stopped, and the backing is stopped at the predetermined position. However, in this case, the position sensor is required, which increases the apparatus size and the cost.

Alternatively, the image reading apparatus sets the backing to the initial position with a spring, and drives the motor to move the backing in a direction for compressing the spring, and continues to drive the motor so as to hold the backing at the predetermined position where the spring is most compressed. On the other hand, when the backing is returned back to the initial position, the image reading apparatus cuts off the power supply to the motor, and returns the backing from the predetermined position to the initial position with the force of the spring. However, in this case, since the spring is required, this increases the apparatus size and the cost, and since it is necessary to continue to drive the motor in order to hold the backing at the predetermined position, the consumed electric power increases.

Alternatively, the image reading apparatus sets the backing to the predetermined position by driving the motor by a certain amount defined in advance. However, when vibrations, shocks, etc., are applied to the image reading apparatus, the current position of the backing may change, and even when the motor is driven by a certain amount, the backing may not move to an appropriate position.

An image reading apparatus including a cleaning member capable of rotating a shaft member fixed to a brush sliding and cleaning a skimming glass arranged between a conveyed document and a scanner is disclosed. The image reading apparatus detects the home position of a cleaning member based on image information obtained from the scanner when the cleaning member is rotated (see Japanese Laid-open Patent Publication No. 2014-120785).

An image reading apparatus identifying the position of a carriage is disclosed. The image reading apparatus rotates the rotation body, and determines whether a rotation position detection mark is detected by an image sensor provided on a carriage, and identifies the position of the carriage based on the rotation angle of the rotation body when the rotation position detection mark is detected (see Japanese Laid-open Patent Publication No. 2014-72821).

SUMMARY

In an image reading apparatus, it is desired to alleviate an increase in the apparatus size and the cost, and set the backing at an appropriate position with a high degree of precision.

It is an object to provide an image reading apparatus, an image reading method, and a computer-readable, non-transitory medium storing a computer program that can alleviate the increase in the apparatus size and the cost, and set the movable light reflecting surface at an appropriate position with a high degree of precision.

According to an aspect of the device, there is provided an image reading apparatus. The image reading apparatus includes an image capturing module for capturing an image of a document, a light source, a movable light reflecting surface having a white color, a driving module for moving the light reflecting surface into a first position at which the light reflecting surface reflects light from the light source and a second position at which the light reflecting surface does not reflect light from the light source, and a control module for controlling the driving module to move the light reflecting surface, wherein the control module determines the second position by moving the light reflecting surface by a predetermined quantity from the first position determined based on an image obtained by the image capturing module.

According to an aspect of the method, there is provided an image reading method. The image reading method includes an image capturing module for capturing an image of a document, a light source, a movable light reflecting surface having a white color, and a driving module for moving the light reflecting surface, and the image reading method includes controlling the driving module to move the light reflecting surface into a first position at which the light reflecting surface reflects light from the light source and a second position at which the light reflecting surface does not reflect light from the light source, and determining the second position by moving the light reflecting surface by a predetermined quantity from the first position determined based on an image obtained by the image capturing module.

According to an aspect of the computer-readable, non-transitory medium storing a computer program, the computer program causes a computer which includes an image capturing module for capturing an image of a document, a light source, a movable light reflecting surface having a white color, and a driving module for moving the light reflecting surface, to execute a process. The process includes controlling the driving module to move the light reflecting surface into a first position at which the light reflecting surface reflects light from the light source and a second position at which the light reflecting surface does not reflect light from the light source, and determining the second position by moving the light reflecting surface by a predetermined quantity from the first position determined based on an image obtained by the image capturing module.

The object and advantages of the invention will be realized and attained by means of the elements and combinations particularly pointed out in the claims. It is to be understood that both the foregoing general description and the following detailed description are exemplary and explanatory, and are not restrictive of the invention, as claimed.

DESCRIPTION OF EMBODIMENTS

Hereinafter, a document conveying apparatus according to an embodiment, will be described with reference to the drawings. However, it should be noted that the technical scope of the invention is not limited to these embodiments, and extends to the inventions described in the claims and their equivalents.

Figure 1:
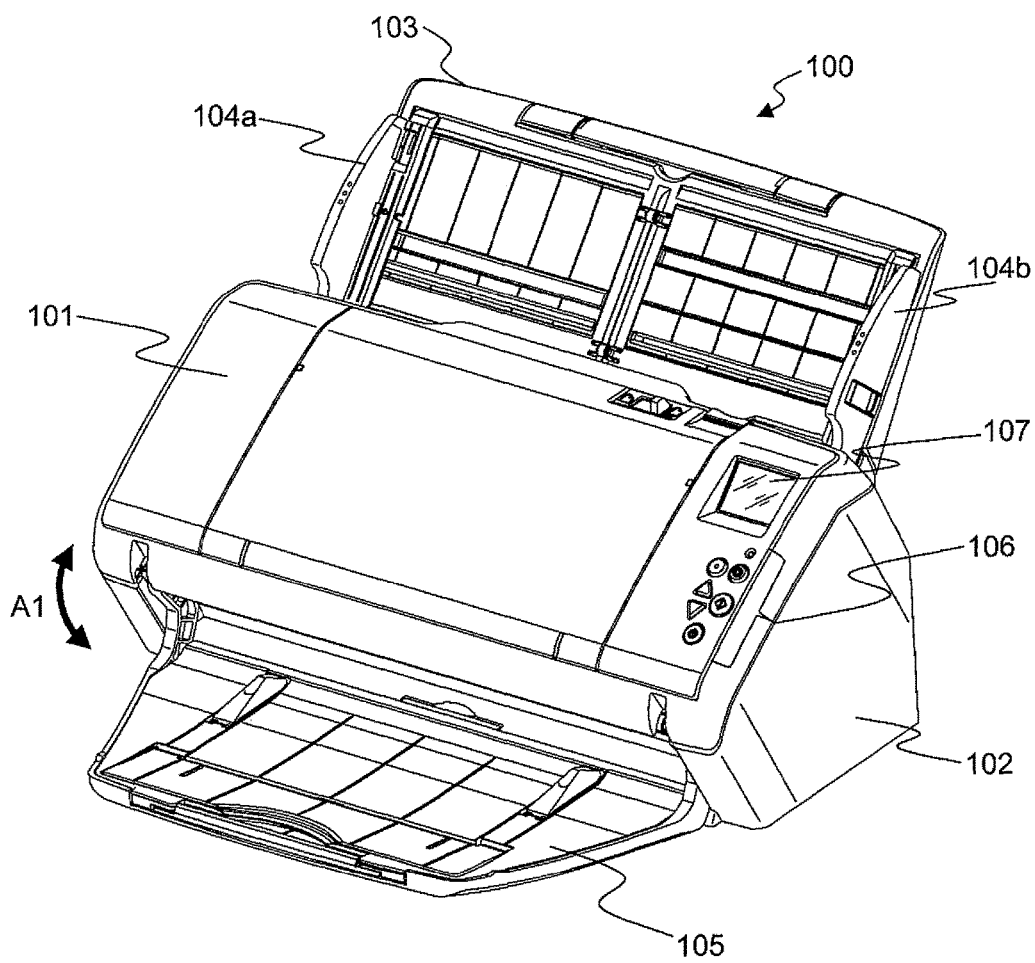
FIG. 1 is perspective view illustrating a document conveying apparatus 100 according to an embodiment.

FIG. 1 is perspective view illustrating a document conveying apparatus 100 configured as an image scanner according to an embodiment.

The document conveying apparatus 100 is an example of an image reading apparatus. The document conveying apparatus 100 includes an upper side housing 101, a lower side housing 102, a document tray 103, a discharged sheet stacker 105, multiple operation buttons 106, a display device 107, etc.

The upper side housing 101 is arranged at a position to cover the upper surface of the document conveying apparatus 100, and is attached to the lower side housing 102 with a hinge so as to be able to open and close, at the time of a paper jam, at the time of cleaning of the document conveying apparatus 100, etc.

The document tray 103 is engaged with the lower side housing 102 in such a manner that the document can be placed on the document tray 103. The document tray 103 is provided with side guides 104a and 104b which can move in a direction perpendicular to the conveying direction of the document. Hereinafter, the side guides 104a and 104b may be collectively referred to as side guides 104.

The discharged sheet stacker 105 is attached to the lower side housing 102 with a hinge in such a manner that the discharged sheet stacker 105 can pivot in a direction indicated by arrow A1, and in the open state as depicted in FIG. 1, the discharged sheet stacker 105 can hold the discharged documents.

Each of the multiple operation buttons 106 is arranged on the surface of the upper side housing 101, and when the operation button 106 is pressed down, the operation button 106 generates and outputs an operation detection signal in accordance with the button.

The display device 107 includes a display constituted by a liquid crystal, an organic EL (Electro-Luminescence), etc., and an interface circuit for outputting image data to the display, and displays the image data to the display.

Figure 2:
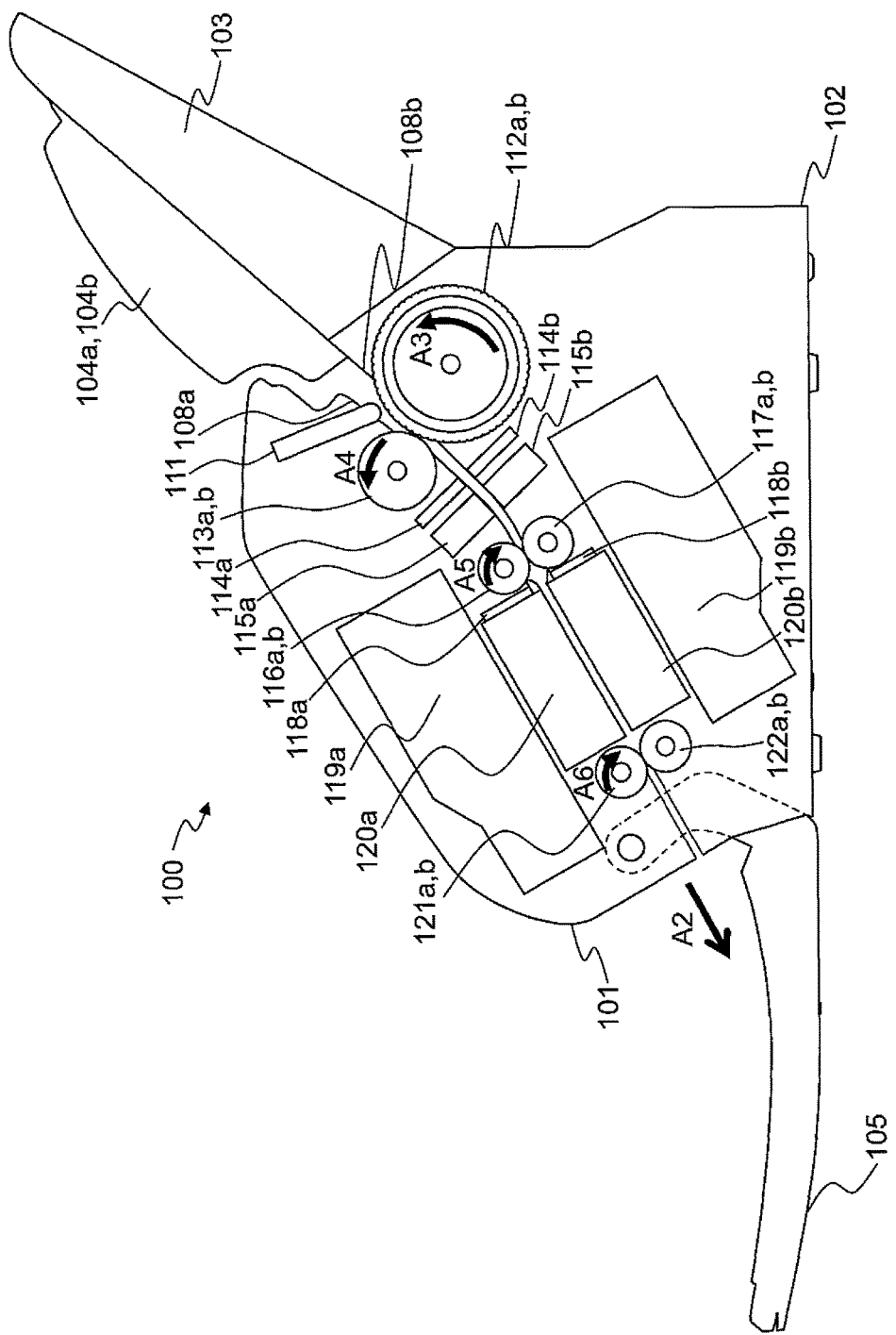
FIG. 2 is a figure for explaining a conveying path inside of the document conveying apparatus 100.

FIG. 2 is a figure for explaining a conveying path inside of the document conveying apparatus 100.

The conveying path inside of the document conveying apparatus 100 includes a contact sensor 111, feeding rollers 112a, 112b, brake rollers 113a, 113b, a first light emitter 114a, a first light receiver 114b, an ultrasonic transmitter 115a, an ultrasonic receiver 115b, first conveying rollers 116a, 116b, first driven rollers 117a, 117b, a second light emitter 118a, a second light receiver 118b, a first image capturing device 119a, a second image capturing device 119b, a first illumination device 120a, a second illumination device 120b, second conveying rollers 121a, 121b, second driven rollers 122a, 122b, etc.

In the following explanation, the feeding rollers 112a and 112b may be collectively referred to as the feeding roller 112. The brake rollers 113a and 113b may be collectively referred to as the brake roller 113. The first conveying rollers 116a and 116b may be collectively referred to as the first conveying roller 116. The first driven rollers 117a and 117b may be collectively referred to as the first driven roller 117. The second conveying rollers 121a and 121b may be collectively referred to as the second conveying roller 121. The second driven rollers 122a and 122b may be collectively referred to as the second driven roller 122.

The lower surface of the upper side housing 101 forms a upper side guide 108a of the conveying route for the documents, and the upper surface of the lower side housing 102 forms an lower side guide 108b of the conveying route for the documents. In FIG. 2, arrow A2 indicates the conveying direction of the documents. In the following explanation, the upstream means the upstream in the conveying direction A2 of the documents, and the downstream means the downstream in the conveying direction A2 of the documents.

The contact sensor 111 is provided at the upstream side with respect to the feeding roller 112 and the brake roller 113, and detects whether or not a document is placed on the document tray 103. The contact sensor 111 generates and outputs a first document detection signal of which signal value changes depending on a state in which the document is placed on the document tray 103 and a state in which the document is not placed on the document tray 103.

The first light emitter 114a and the first light receiver 114b are provided at the downstream side with respect to the feeding roller 112 and the brake roller 113 and at the upstream side with respect to the first conveying roller 116 and the first driven roller 117, and are arranged to face each other with the conveying route for the documents interposed therebetween. The first light emitter 114a emits light to the first light receiver 114b. The first light receiver 114b detects light emitted from the first light emitter 114a, and generates and outputs a second document detection signal which is an electric signal according to the detected light. More specifically, the second document detection signal is a signal of which signal value changes depending on a state in which a document exists between the first light emitter 114a and the first light receiver 114b and a state in which any document does not exist between the first light emitter 114a and the first light receiver 114b. Hereinafter, the first light emitter 114a and the first light receiver 114b may be collectively referred to as the first light sensor 114.

The ultrasonic transmitter 115a and the ultrasonic receiver 115b are arranged in proximity to the conveying route for the documents so as to face each other with the conveying route interposed therebetween. The ultrasonic transmitter 115a transmits an ultrasonic wave. On the other hand, the ultrasonic receiver 115b detects the ultrasonic wave that has been transmitted by the ultrasonic transmitter 115a and that has passed through a document, and generates and outputs an ultrasonic signal which is an electric signal according to the detected ultrasonic wave. In the following explanation, the ultrasonic transmitter 115a and the ultrasonic receiver 115b may be collectively referred to as the ultrasonic sensor 115.

The second light emitter 118a and the second light receiver 118b are provided at the downstream side with respect to the first conveying roller 116 and the first driven roller 117 and provided at the upstream side with respect to the first image capturing device 119a and the second image capturing device 119b, and are arranged to face each other with the conveying route for the documents interposed therebetween. The second light emitter 118a emits light to the second light receiver 118b. The second light receiver 118b detects light emitted from the second light emitter 118a, and generates and outputs a third document detection signal which is an electric signal according to the detected light. More specifically, the third document detection signal is a signal of which signal value changes depending on a state in which a document exists between the second light emitter 118a and the second light receiver 118b and a state in which any document does not exist between the second light emitter 118a and the second light receiver 118b. Hereinafter, the second light emitter 118a and the second light receiver 118b may be collectively referred to as the second light sensor 118.

The first image capturing device 119a includes an image capturing sensor of a reduced optical system type having an image capturing device based on CCD (Charge Coupled Device) arranged in a linear manner in a main scanning direction. This image capturing sensor reads the back surface of the document, and generates and outputs an analog image signal. Likewise, the second image capturing device 119b includes an image capturing sensor of a reduced optical system type based on CCD arranged in the linear manner in the main scanning direction. This image capturing sensor generates and outputs an analog image signal by reading the front surface of the document. It should be noted that only one of the first image capturing device 119a and the second image capturing device 119b may be provided to read only one of the surfaces of a document. Alternatively, it may possible to use a CIS (Contact Image Sensor) of the same-size optical system type having an image capturing device based on CMOS (Complementary Metal Oxide Semiconductor) instead of the CCD. Hereinafter, the first image capturing device 119a and the second image capturing device 119b may be collectively referred to as the image capturing device 119

The first illumination device 120a includes a light source for illuminating the back surface of a document and a backing that is used for the front surface of the document, and is arranged at a position between the first image capturing device 119a and the document conveying route so that the first illumination device 120a faces the second image capturing device 119b. Likewise, the second illumination device 120b includes a light source for illuminating the front surface of a document and a backing that is used for the back surface of the document, and is arranged at a position between the second image capturing device 119b and the document conveying route so that the second illumination device 120b faces the first image capturing device 119a. Hereinafter, the first illumination device 120a and the second illumination device 120b may be collectively referred to as the illumination device 120.

When the feeding roller 112 rotates in the direction indicated by arrow A3 of FIG. 2, the document placed on the document tray 103 is conveyed between the upper side guide 108a and the lower side guide 108b in the document conveying direction A2. While the document is conveyed, the brake roller 113 rotates in the direction of the arrow A4 of FIG. 2. When multiple documents are placed on the document tray 103, only one of the documents placed on the document tray 103 that is in contact with the feeding roller 112 is separated with the action of the feeding roller 112 and the brake roller 113. Therefore, this operates so as to limit the conveying of a document other than the separated document (prevention of multifeed). The feeding roller 112 and the brake roller 113 functions as a separation module for a document.

The document is fed between the first conveying roller 116 and the first driven roller 117 while the document is guided by the upper side guide 108a and the lower side guide 108b. When the first conveying roller 116 rotates in the direction of the arrow A5 of FIG. 2, the document is fed between the first image capturing device 119a and the second image capturing device 119b. When the second conveying roller 121 rotates in the direction of the arrow A6 of FIG. 2, the document, which has been read by the image capturing device 119, is discharged onto the discharged sheet stacker 105.

Figure 3:
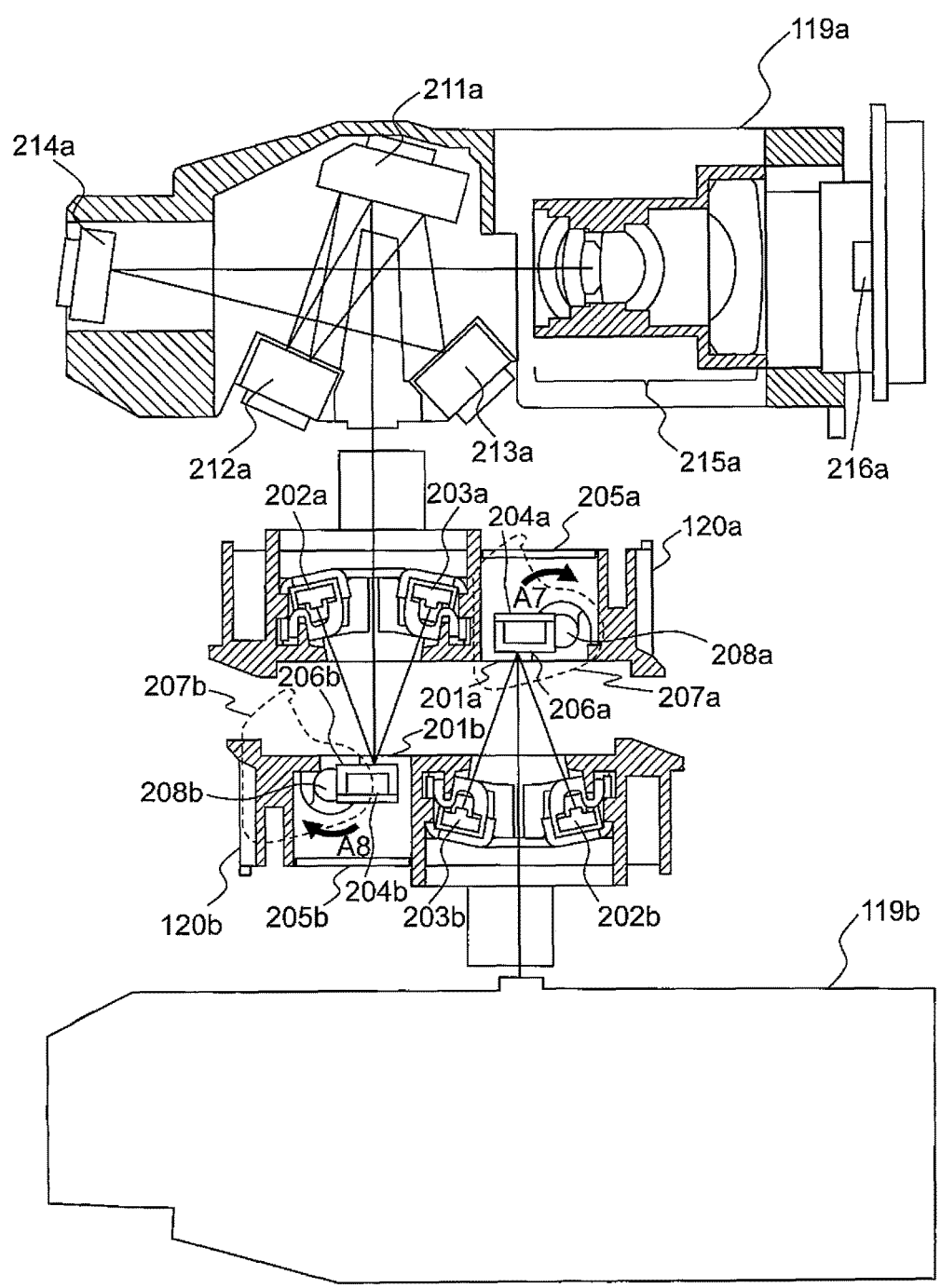
FIG. 3 is a schematic view for explaining an image capturing device 119 and an illumination device 120.
Figure 4:
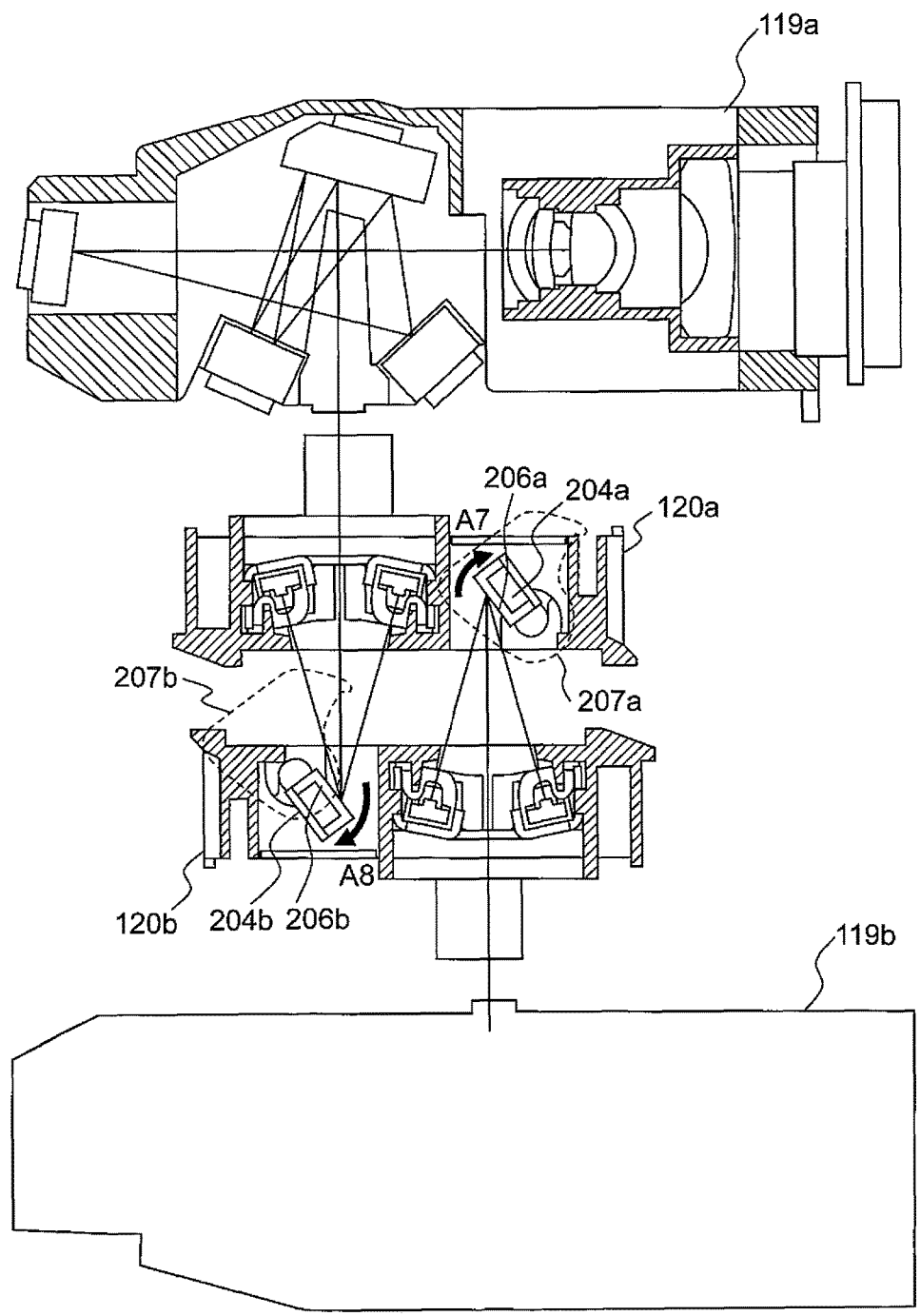
FIG. 4 is a schematic view for explaining the image capturing device 119 and the illumination device 120
Figure 5:
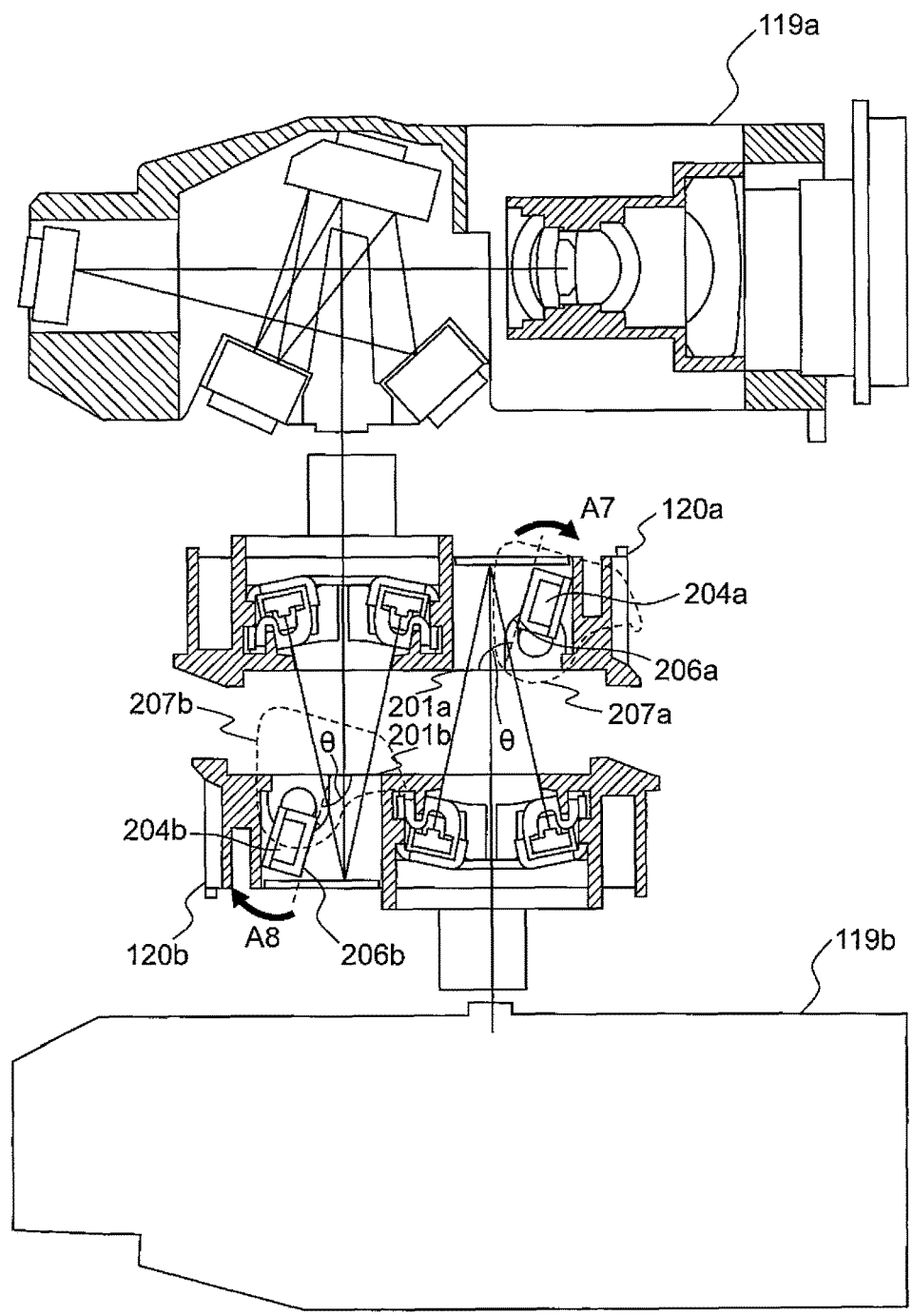
FIG. 5 is a schematic view for explaining the image capturing device 119 and the illumination device 120.

FIG. 3 to FIG. 5 are schematic views for explaining the image capturing device 119 and the illumination device 120.

As depicted in FIG. 3, the first illumination device 120a includes a first glass surface 201a, first light sources 202a, 203a, a first backing 204a, and a first wall portion 205a. The first backing 204a is a plate. The first backing 204a is arranged at a position facing the second image capturing device 119b, and includes a facing surface 206a facing the second image capturing device 119b. The facing surface 206a is an example of a movable light reflecting surface for reflecting light from the second illumination device 120b. The facing surface 206a is white. A first cam 207a moves the first backing 204a. More specifically, the first cam 207a rotates the first backing 204a. The first backing 204a is connected to the first cam 207a, which rotates the first backing 204a, via the rotation shaft 208a of the first cam 207a, and is provided to be capable to rotate in the direction of arrow A7 in accordance with the rotation of the first cam 207a. In other words, the first backing 204a is provided to be capable to move in accordance with the movement of the first cam 207a. The first wall portion 205a is provided at such a position where the first wall portion 205a faces the second image capturing device 119b when the first backing 204a pivots in the direction of the arrow A7 as depicted in FIGS. 4 and 5 and is not the position facing the second image capturing device 119b. The surface of the first wall portion 205a that faces the second image capturing device 119b is black.

Likewise, the second illumination device 120b includes a second glass surface 201b, second light sources 202b, 203b, a second backing 204b, and a second wall portion 205b is arranged at a position facing the first image capturing device 119a, and includes a facing surface 206b facing the first image capturing device 119a. The second backing 204b is a plate. The facing surface 206b is an example of a movable light reflecting surface for reflecting light from the first illumination device 120a. The facing surface 206b is white. The second backing 204b is connected to the second cam 207b, which rotates the second backing 204b, via the rotation shaft 208b of the second cam 207b, and is provided to be able to pivot in the direction of arrow A8 in accordance with the rotation of the second cam 207b. The second wall portion 205b is provided at such a position where the second wall portion 205b faces the first image capturing device 119a when the second backing 204b pivots in the direction of the arrow A8 as depicted in FIGS. 4 and 5 and is not the position facing the first image capturing device 119a. The surface of the second wall portion 205b that faces the first image capturing device 119a is black.

Hereinafter, the first glass surface 201a and the second glass surface 201b may be collectively referred to as the glass surface 201. Hereinafter, the first backing 204a and the second backing 204b may be collectively referred to as the backing 204. Hereinafter, the first wall portion 205a and the second wall portion 205b may be collectively referred to as the wall portion 205. Hereinafter, the facing surface 206a and the facing surface 206b may be collectively referred to as the facing surface 206. Hereinafter, the first cam 207a and the second cam 207b may be collectively referred to as cam 207.

The first image capturing device 119a includes first mirrors 211a to 214a, a first lens group 215a, a first image capturing device 216a, etc.

When any document is not conveyed in the state as depicted in FIG. 3, the light emitted from the first light sources 202a, 203a are reflected by the facing surface 206b of the second backing 204b, and passes through the first mirrors 211a to 214a and the first lens group 215a, and an image is formed on the first image capturing device 216a. The image based on the image signal generated at this occasion is used as a white reference image for correcting the read image obtained by reading the document. Hereinafter, the position where the facing surface 206 of the backing 204 is caused to face the image capturing device 119 and the image capturing device 119 can obtain a white reference image will be referred to as a facing position. The facing position is an example of a first positon at which the facing surface 206b (light reflecting surface) reflects the light from the light sources 202a, 203a.

As depicted in FIG. 4, when the second backing 204b is caused to pivot in the direction of the arrow A8 in accordance with the rotation of the second cam 207b, the facing surface 206b of the second backing 204b is not the facing position. As depicted in FIG. 5, when the second backing 204b is caused to further pivot in the direction of the arrow A8, the light emitted from the first light sources 202a, 203a is reflected by the second wall portion 205b, and an image is formed on the first image capturing device 216a. The image based on the image signal generated at this occasion is used as a black reference image for correcting the read image. Hereinafter, the position where the facing surface 206 of the backing 204 is caused to not be the facing position and the image capturing device 119 can obtain a black reference image will be referred to as a non-facing position. The non-facing position is an example of a second positon at which the facing surface 206b (light reflecting surface) does not reflect the light from the light sources 202a, 203a.

While the document is conveyed, the light emitted from the first light sources 202a, 203a is reflected by the conveyed document, and an image is formed on the first image capturing device 216a. The image based on the image signal generated at this occasion is used as a read image obtained by reading the document. As depicted in FIG. 3, when the second backing 204b is located at the facing position, the light emitted from the first light sources 202a, 203a is reflected by the facing surface 206b at a position where any document does not exist in the direction perpendicular to the document conveying direction, and an image is formed on the first image capturing device 216a. In this case, the background color of the document in the read image is white. On the other hand, as depicted in FIG. 5, when the second backing 204b is located at the non-facing position, the light emitted from the first light sources 202a, 203a is reflected by the second wall portion 205b at a position where any document does not exist in the direction perpendicular to the document conveying direction, and an image is formed on the first image capturing device 216a. In this case, the background color of the document in the read image is black.

The configuration of the second image capturing device 119b is the same as the configuration of the first image capturing device 119a, and therefore, detailed explanation is omitted.

It should be noted that the backing 204 is provided in such a manner that, as depicted in FIG. 3, when the backing 204 is at the facing position, the facing surface 206 is in parallel with the glass surface 201, and as depicted in FIG. 5, when the backing 204 is at the non-facing position, the angle θ formed by the facing surface 206 and the glass surface 201 is more than 90 degrees (for example, 100 degrees). When the angle formed by the facing surface 206b and the second glass surface 201b is caused to be more than 90 degrees when the backing 204 is at the non-facing position, this can completely prevent the light emitted from the first light sources 202a, 203a from being cast upon the facing surface 206b and reflected by the facing surface 206b. Therefore, the brightness value of the image obtained when the backing 204 is located at the non-facing position can be caused to be close to zero.

Figure 6:
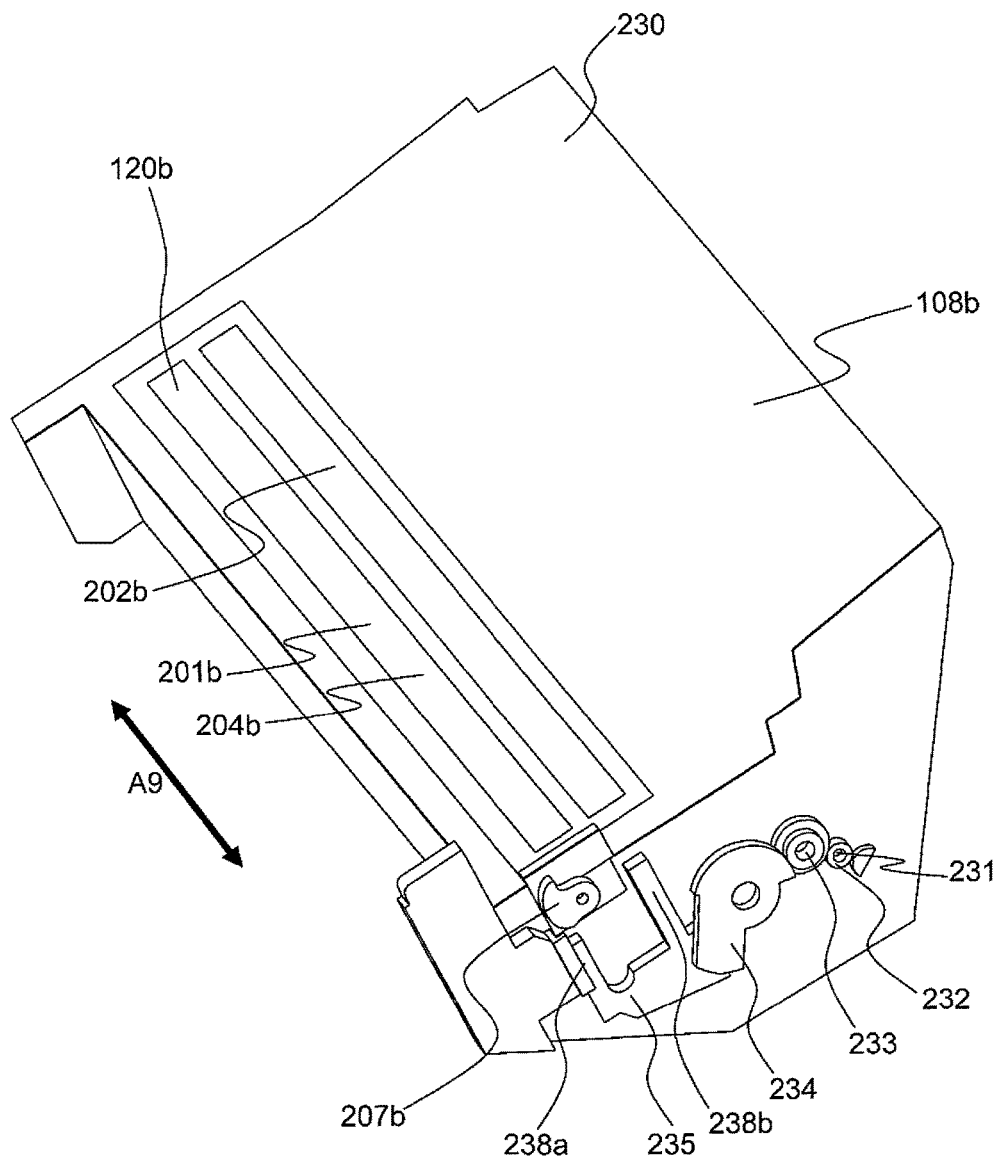
FIG. 6 is a schematic view for explaining a structure of a backing 204 and a cam 207.

FIG. 6 is a schematic view for explaining a structure of the backing 204 and the cam 207.

The lower side component 230 as shown in FIG. 6 is a component existing inside of an external housing portion (frame) of the lower side housing 102, and includes a second illumination device 120b. As depicted in FIG. 6, in the lower side component 230, the second cam 207b is provided at an end portion, in the longitudinal direction A9, of the second backing 204b of the second illumination device 120b, in such a manner that the second cam 207b is perpendicular to the longitudinal direction A9 of the second backing 204*b*, and rotates about an axis parallel to the longitudinal direction A9 of the second backing 204*b*.

Likewise, an upper side component existing inside of an external housing portion (frame) of the upper side housing 101 has the first illumination device 120*a*. In the upper side component, the first cam 207*a* is provided at an end portion, in the longitudinal direction, of the first backing 204*a* of the first illumination device 120*a*, in such a manner that the first cam 207*a* is perpendicular to the longitudinal direction of the first backing 204*a*, and rotates about an axis parallel to the longitudinal direction of the first backing 204*a*.

FIGS. 7A to 7C, FIGS. 8A to 8C are schematic views illustrating the upper side component 250 and the lower side component 230 when it is seen in the direction perpendicular to the document conveying direction.

Figure 7A:
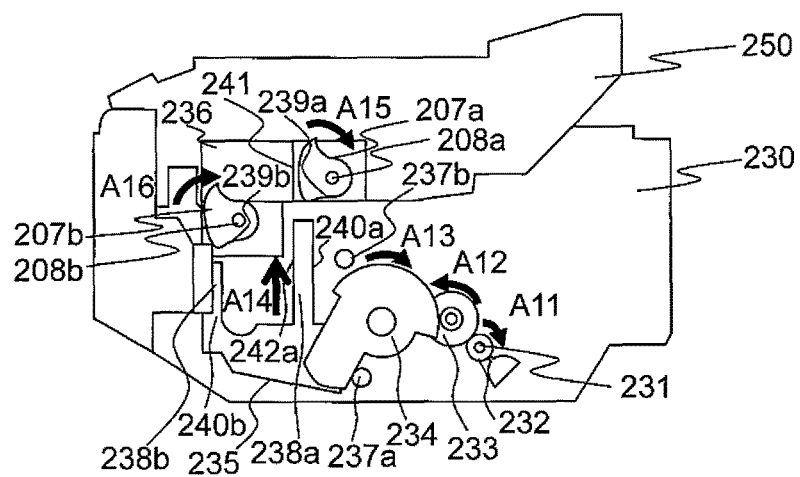
FIG. 7A is a schematic view illustrating an upper side component 250 etc., when it is seen in a direction perpendicular to the document conveying direction.

As depicted in FIG. 7A, the backing driving device 231, the first gear 232, the second gear 233, the third cam 234, the transmission member 235, the first boss 237*a*, the second boss 237*b*, and the second cam 207*b* are provided on the side surface of the lower side component 230. The fixed member 236 and the first cam 207*a* are provided on the side surface of the upper side component 250. The first gear 232 is attached to the rotation shaft of the backing driving device 231. The second gear 233 is engaged with the first gear 232, and the third cam 234 is engaged with the second gear 233, and the transmission member 235 is connected to the third cam 234.

The first cam 207*a* and the second cam 207*b* have contacted portions 239*a* and 239*b*, respectively, which come into contact with the transmission member 235. The contacted portions 239*a* and 239*b* are examples of a first portion. The fixed member 236 is fixed to the upper side component 250, and has a second contacted portion 241 that comes into contact with the transmission member 235. The contacted portion 241 is an example of a third portion. On the other hand, the transmission member 235 has a first arm 238*a* including a contact portion 240*a* that comes into contact with a contacted portion 239*a* of the first cam 207*a* and a second contact portion 242*a* that comes into contact with the second contacted portion 241 of the fixed member 236. Further, the transmission member 235 has a second arm 238*b* having a contact portion 240*b* that comes into contact with a contacted portion 239*b* of the second cam 207*b*. The contact portions 240*a* and 240*b* are examples of a second portion. The contact portion 242*a* is an example of a fourth portion.

A force in the direction opposite to arrows A15, A16 is applied to the cam 207 by a spring (not shown), and as depicted in FIG. 7A, the cam 207 is engaged in the state as depicted in FIG. 7A in the state where the transmission member 235 is not in contact with the cam 207. Accordingly, in the state as depicted in FIG. 7A, the backing 204 is set in the facing position.

In this state, the force opposite to the direction of arrow A14 is applied to the transmission member 235 by its own weight. In this state, the transmission member 235 is engaged in the state as depicted in FIG. 7A.

Figure 7B:
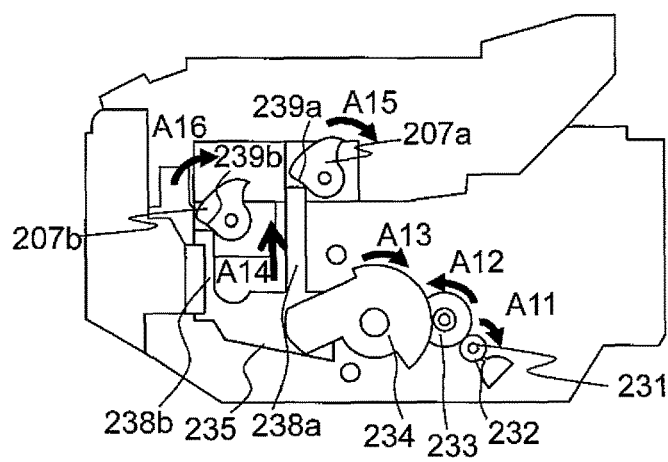
FIG. 7B is a schematic view illustrating the upper side component 250 etc., when it is seen in a direction perpendicular to the document conveying direction.

The backing driving device 231 is an example of a driving module, and includes one or more motors, and provides a driving force, and the backing driving device 231 rotates the first gear 232. When the backing driving device 231 is rotated in the forward direction in the state as depicted in FIG. 7A, the driving force provided by the backing driving device 231 causes the first gear 232 to rotate in the direction of the arrow A11, causes the second gear 233 to rotate in the direction of the arrow A12, and causes the third cam 234 to rotate in the direction of the arrow A13. Accordingly, the transmission member 235 slides and moves in the direction of the arrow A14. As a result, as depicted in FIG. 7B, the ends of the first arm 238*a* and the second arm 238*b* of the transmission member 235 come into contact with the contacted portion 239*a* of the first cam 207*a* and the contacted portion 239*b* of the second cam 207*b*, respectively. When the contacted portion 239*a* and the contacted portion 239*b* are pushed up by the ends of the first arm 238*a* and the second arm 238*b*, respectively, the first cam 207*a* and the second cam 207*b* rotates in the direction of the arrow A15 and the arrow A16.

Figure 7C:
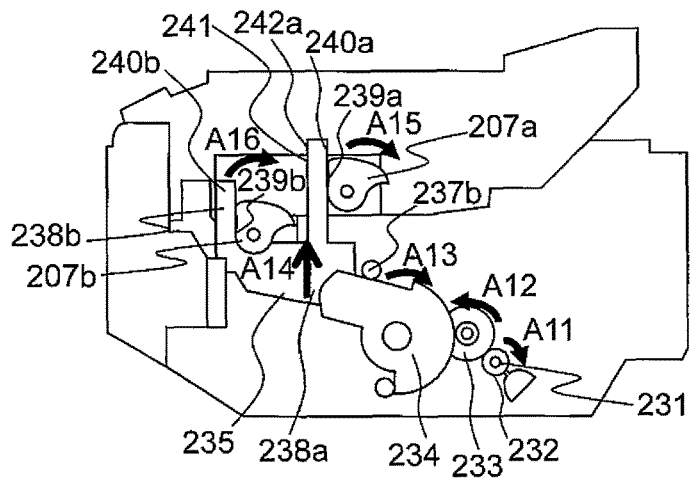
FIG. 7C is a schematic view illustrating the upper side component 250 etc., when it is seen in a direction perpendicular to the document conveying direction.

As depicted in FIG. 7C, the third cam 234 rotates in the direction of the arrow A13, and the transmission member 235 slides and moves in the direction of the arrow A14. Accordingly, the first cam 207*a* and the second cam 207*b* rotates and attains the state as depicted in FIG. 7C, and in the state as depicted in FIG. 7C, the first backing 204*a* and the second backing 204*b* are set in the non-facing position. The transmission member 235 brings the contact portion 240*a* of the first arm 238*a* and the contact portion 240*b* of the second arm 238*b* into contact with the contacted portion 239*a* of the first cam 207*a* and the contacted portion 239*b* of the second cam 207*b*, respectively. Further, the transmission member 235 brings the second contact portion 242*a* of the first arm 238*a* into contact with the second contacted portion 241 of the fixed member 236. In this state, the angle formed by the contact portion 240*a* and the contacted portion 239*a* and the angle formed by the contact portion 240*b* and the contacted portion 239*b* is more than 90 degrees (for example 100 degrees). Accordingly, as described above, the light emitted from the light source of the image capturing device 119 can be completely prevented from being cast upon the facing surface 206 and reflected by the facing surface 206, and the brightness value of the image obtained when the backing 204 is located at the non-facing position can be caused to be close to zero.

Accordingly, the frictional force between the contact portion 240*a* and the contacted portion 239*a*, the frictional force between the contact portion 240*b* and the contacted portion 239*a*, and the frictional force between the second contact portion 242*a* and the second contacted portion 241 are more than the gravity associated with the transmission member 235, so that the transmission member 235 is supported. Therefore, even when supply of electric power to the backing driving device 231 is cut off, the transmission member 235 stops the first cam 207*a* and the second cam 207*b*, and causes the first cam 207*a* and the second cam 207*b* to be held in the facing position. In other words, the transmission member 235 holds the light reflecting surface at the predetermined position when there is no driving force. It should be noted that the force for supporting the transmission member 235 is reinforced by the frictional forces between the transmission member 235 and a change link (not shown), between the change link and the third cam 234, between the third cam 234 and the second gear 233, and between the second gear 233 and the first gear 232. Further, the force for supporting the transmission member 235 is also reinforced by the frictional force between the first gear 232 and the driving device 231 and the detent torque of the driving device 231.

Figure 8A:
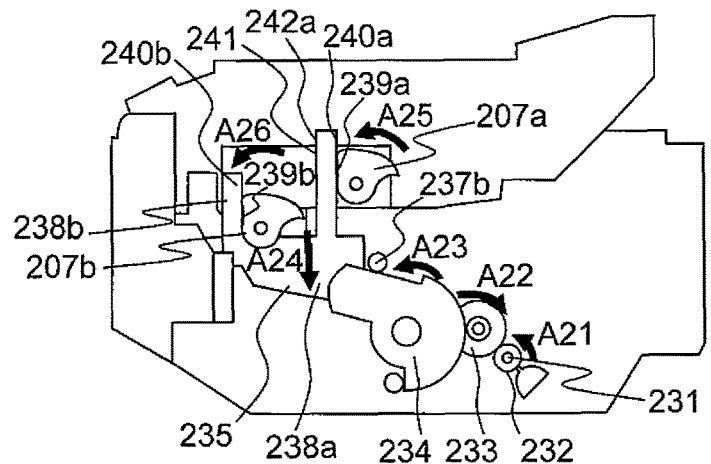
FIG. 8A is a schematic view illustrating the upper side component 250 etc., when it is seen in a direction perpendicular to the document conveying direction.
Figure 8B:
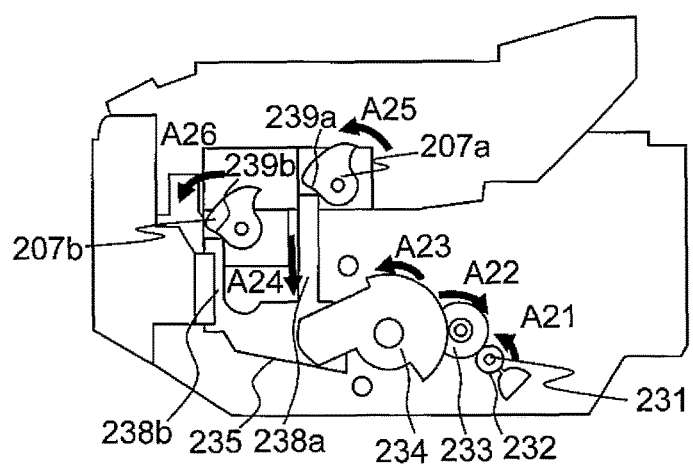
FIG. 8B is a schematic view illustrating the upper side component 250 etc., when it is seen in a direction perpendicular to the document conveying direction.
Figure 8C:
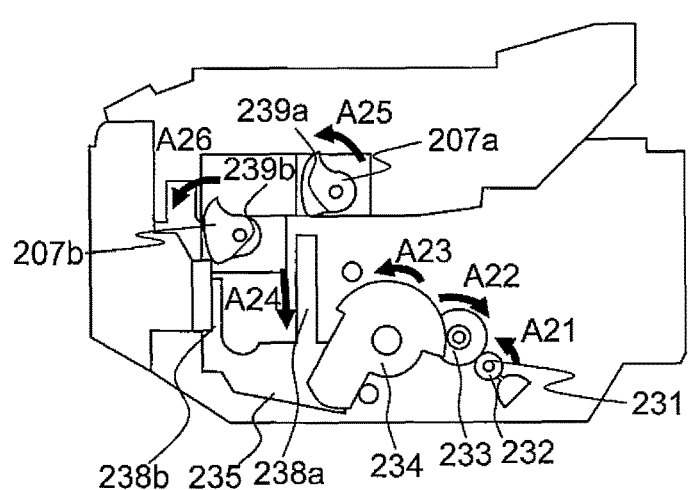
FIG. 8C is a schematic view illustrating the upper side component 250 etc., when it is seen in a direction perpendicular to the document conveying direction.

On the other hand, as depicted in FIG. 8A, when the backing driving device 231 is rotated in the opposite direction while the first cam 207*a* and the second cam 207*b* are pivoting, the driving forces are applied to the first gear 232, the second gear 233, and the third cam 234 so as to rotate the first gear 232, the second gear 233, and the third cam 234 in the directions of the arrows A21, A22, and A23, respectively. The driving force given by the backing driving device 231 is more than the frictional force between the contact portion 240a and the contacted portion 239a, the frictional force between the contact portion 240b and the contacted portion 239a, and the frictional force between the second contact portion 242a and the second contacted portion 241. Accordingly, as depicted in FIG. 8B and FIG. 8C, the transmission member 235 slides and moves in the direction of the arrow A24, and the first cam 207a and the second cam 207b rotates in the directions of the arrows A25, A26 by the force of the spring. Then, in the state as depicted in FIG. 8C, the first backing 204a and the second backing 204b are set at the facing position.

As described above, the backing driving device 231 switches the backing 204 into the facing position and the non-facing position. In other words, the backing driving device 231 moves the facing surface 206 (light reflecting surface) into the first position and the second position.

Figure 9:
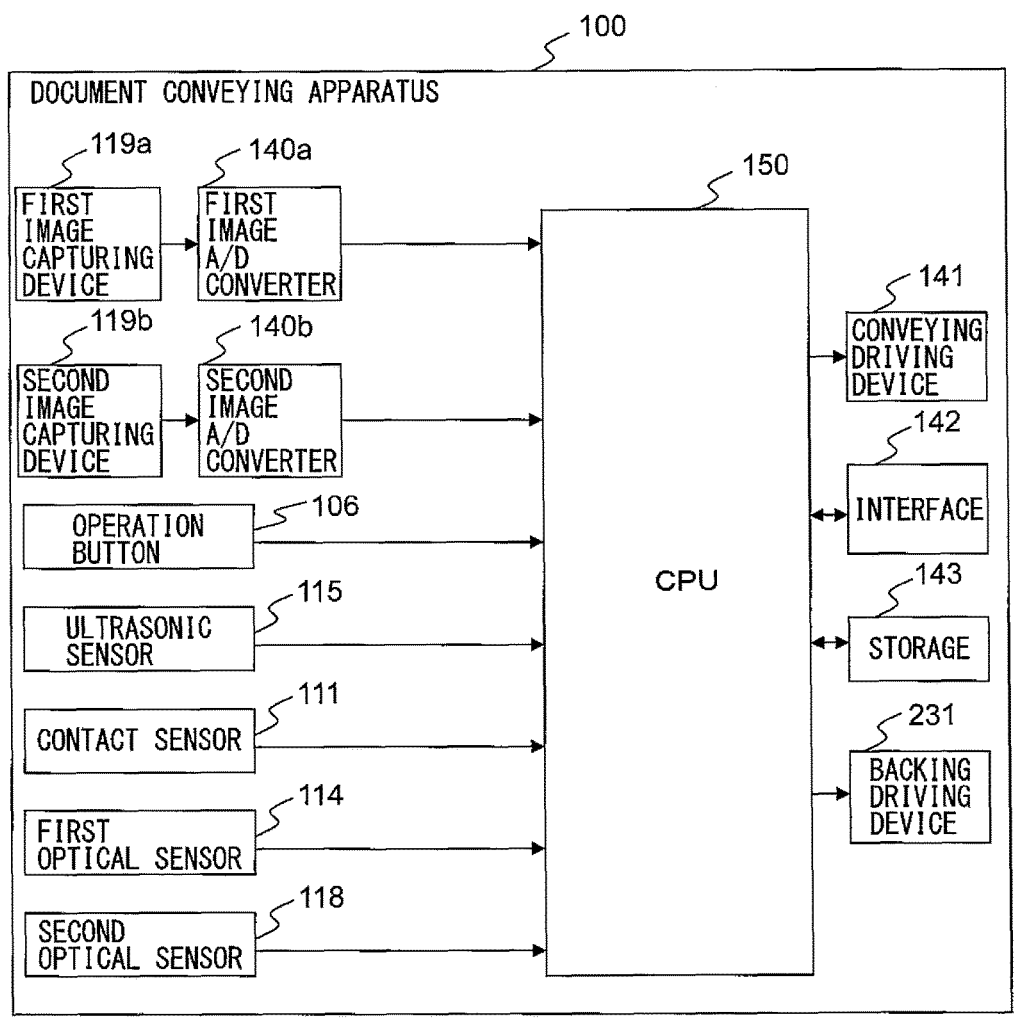
FIG. 9 is a block diagram illustrating a schematic configuration of the document conveying apparatus 100.

FIG. 9 is a block diagram illustrating a schematic configuration of the document conveying apparatus 100.

The document conveying apparatus 100 includes not only the configuration as described above but also a first A/D converter 140a, a second A/D converter 140b, a conveying driving device 141, an interface 142, a storage 143, a CPU (Central Processing Unit) 150, etc.

The first A/D converter 140a performs analog digital conversion to convert an analog image signal which is output from the first image capturing device 119a, and generate digital image data, and outputs the digital image data to the CPU 150. Likewise, the second A/D converter 140b performs analog digital conversion to convert an analog image signal which is output from the second image capturing device 119b, and generate digital image data, and outputs the digital image data to the CPU 150. These digital image data are used as read image. Hereinafter, the first A/D converter 140a and the second A/D converter 140b may be collectively referred to as the A/D converter 140.

The conveying driving device 141 includes one or more motors, and in accordance with a control signal from the CPU 150, the one or more motors rotate the feeding roller 112, the brake roller 113, the first conveying roller 116, and the second conveying roller 121 to perform conveying operation of the documents.

The interface 142 includes, for example, an interface circuit based on a serial bus such as USB, and electrically connects with an information processing apparatus, not shown (for example, a personal computer, a portable information terminal, etc.), and transmits and receives read images and various kinds of information. Instead of the interface 142, an antenna for transmitting and receiving a wireless signal and a communication module having a wireless communication interface circuit for transmitting and receiving a signal via a wireless communication circuit in accordance with a predetermined communication protocol may be used. The predetermined communication protocol may be, for example, a wireless LAN (Local Area Network).

The storage 143 includes memory devices such as a RAM (Random Access Memory), a ROM (Read Only Memory), etc., a fixed disk device such as a hard disk, or a portable storage device such as a flexible disk, an optical disk, etc. The storage 143 stores computer programs, databases, tables, etc., used for various kinds of processing of the document conveying apparatus 100. The computer program may be installed on the storage 143 from a computer-readable, non-transitory medium such as a compact disk read only memory (CD-ROM), a digital versatile disk read only memory (DVD-ROM), or the like by using a well-known setup program or the like. Further, the storage 143 stores the read images.

The CPU 150 operates based on a program stored in the storage 143 in advance. Alternatively, a DSP (digital signal processor), an LSI (large scale integration), etc., may be used instead of the CPU 150. As another alternative, an ASIC (Application Specific Integrated Circuit), an FPGA (Field-Programming Gate Array), etc., may be used instead of the CPU 150.

The CPU 150 is connected to the operation button 106, the contact sensor 111, the first light sensor 114, the ultrasonic sensor 115, the second light sensor 118, the first image capturing device 119a, the second image capturing device 119b, the first A/D converter 140a, the second A/D converter 140b, the conveying driving device 141, the interface 142, the storage 143, the backing driving device 231, etc., and controls each of these modules. The CPU 150 performs driving control of the conveying driving device 141 and the backing driving device 231, document reading control of the image capturing device 119, etc., and obtains read images.

Figure 10:
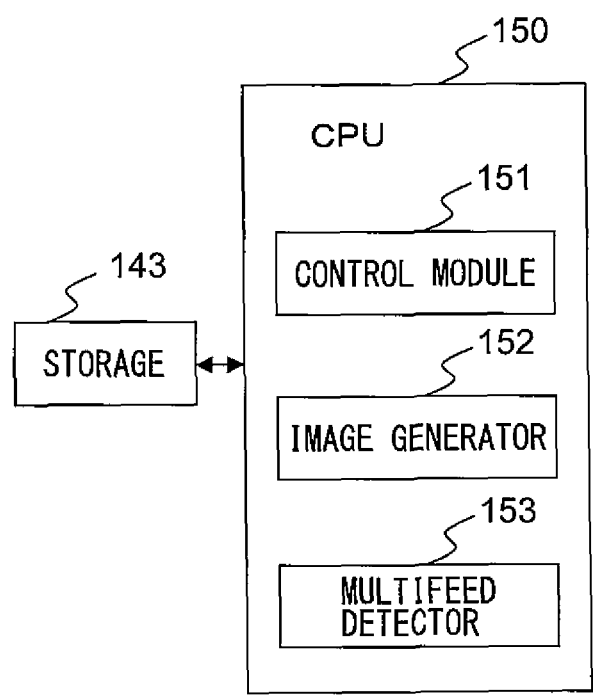
FIG. 10 is a figure illustrating a schematic configuration of a CPU 150.

FIG. 10 is a figure illustrating a schematic configuration of the CPU 150.

As depicted in FIG. 10, the CPU 150 includes a control module 151, an image generator 152, a multifeed detector 153, etc. Some of these components may be functional modules implemented by software or firmware running on a processor. Note that some of these components may be formed by independent integrated circuits, microprocessors or the like.

Figure 11:
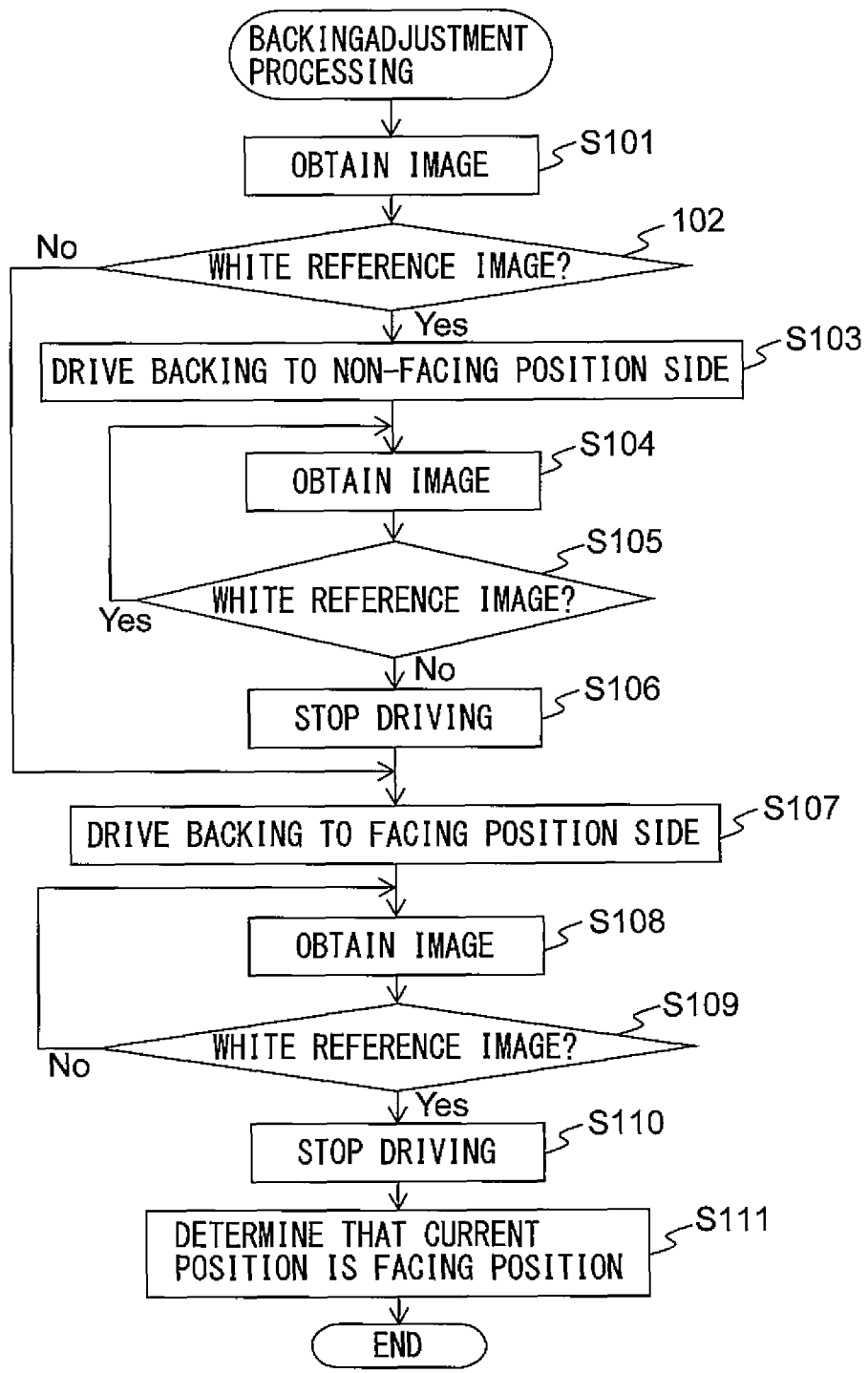
FIG. 11 is a flow chart illustrating an example of an operation of backing adjustment processing.

FIG. 11 is a flow chart illustrating an example of an operation of backing adjustment processing.

Hereinafter, an example of an operation of the backing adjustment processing of the document conveying apparatus 100 will be explained with reference to the flow chart as depicted in FIG. 11. It should be noted that the flow of the operation explained below is executed mainly by the CPU 150 in cooperation with each element of the document conveying apparatus 100 based on a program stored in the storage 143 in advance. The flow of the operation as depicted in FIG. 11 is executed when the apparatus is activated. It should be noted that the flow of the operation as depicted in FIG. 11 may be executed with any given timing when the document reading processing is not executed, or with a regular interval, or in response to a command given by the user.

First, the control module 151 obtains an image, which is read by the image capturing device 119, via the A/D converter 140 (step S101).

Subsequently, the control module 151 determines whether the obtained image is a white reference image made by capturing the image of the facing surface 206 of the backing 204 (step S102).

The control module 151 extracts each color component of RGB of each pixel in a predetermined area of the image obtained by the image capturing device 119, and calculates the average value of the gray level values of the pixels for each color component. When the average value of each color component is equal to or more than a threshold value defined in advance of the color component, the control module 151 determines that the obtained image is the white reference image. The predetermined area is defined in an area where the light quantity received from the light source is stable (for example, an area within 100 pixels from the pixel located in the center of the obtained image). It should be noted that the threshold value for each color component is set to a gray level value which is deemed to be expressing white color. As described above, the control module 151 detects the white reference image based on the image obtained by the image capturing device 119.

It should be noted that the control module 151 may determine the white reference image based on the average value of the gray level values of any given color component, instead of determining the white reference image based on the average value of the gray level values of each color component of RGB. In this case, the control module 151 can reduce the processing load of the detection processing of the white reference image. It should be noted that the fluctuation ranges of the gray level value of white color in the image and the gray level value of black color in the image are the largest in the G component among the color components of RGB. Therefore, when the control module 151 determines the white reference image based on the average value of the gray level values of the G component, the control module 151 can reduce the processing load of the detection processing while alleviating the reduction of the detection precision of the white reference image.

The control module 151 may determine the white reference image based on each pixel of the entire image instead of determining the white reference image based on each pixel in a predetermined area in the image. Alternatively, the control module 151 may determine the white reference image based on a single pixel in the image. Instead of determining the white reference image based on the images obtained by the first image capturing device 119a and the second image capturing device 119b, the control module 151 may determine the white reference image based on the image obtained by any one of the image capturing devices. Accordingly, the control module 151 can reduce the processing load of the detection processing of the white reference image.

When the obtained image is the white reference image, then, the backing 204 is considered to be already existing in proximity to the facing position. In this case, the control module 151 executes the processing of steps S103 to S106 that follows, in order to set the backing 204 to the facing position with a high degree of precision. On the other hand, when the obtained image is not the white reference image, the processing in steps S103 to S106 is omitted.

When the control module 151 determines that the obtained image is not the white reference image, the control module 151 causes the processing to proceed to step S107.

On the other hand, when the control module 151 determines that the obtained image is the white reference image, the control module 151 drives the backing driving device 231 so as to rotate the backing driving device 231 backward, and more specifically, the control module 151 drives the backing driving device 231 so as to rotate the backing 204 from the facing position side to the non-facing position side (step S103).

Subsequently, the control module 151 obtains the image read by the image capturing device 119 via the A/D converter 140 (step S104).

Subsequently, the control module 151 determines whether the obtained image is the white reference image in the same manner as step S102 (step S105). It should be noted that the control module 151 may further determine whether a difference between the average value of the gray level values calculated from the obtained image and the average value of the gray level values calculated from the image obtained immediately before is less than a threshold value. When the calculated difference is less than the threshold value, the control module 151 determines that the obtained image is not changed, and that it is the white reference image.

When the control module 151 determines that the obtained image is the white reference image, the control module 151 determines that the backing 204 is still existing at the facing position, and returns the processing back to step S104 to repeat the processing in steps S104 to S105.

On the other hand, when the control module 151 determines that the obtained image is not the white reference image, the control module 151 determines that the backing 204 is not the facing position, and temporarily stops the driving of the backing driving device 231 (step S106).

Subsequently, the control module 151 drives the backing driving device 231 to rotate the backing driving device 231 forward, and more specifically, the control module 151 drives the backing driving device 231 to rotate the backing 204 from the non-facing position side to the facing position side (step 107).

Subsequently, the control module 151 obtains the image read by the image capturing device 119 via the A/D converter 140 (step S108).

Subsequently, the control module 151 determines whether the obtained image is the white reference image in the same manner as step S102 (step S109). It should be noted that the control module 151 may further determine whether a difference between the average value of the gray level values calculated from the obtained image and the average value of the gray level values calculated from the image obtained immediately before is less than a threshold value. When the calculated difference is equal to or more than the threshold value, the control module 151 determines that the backing 204 is still rotating, and has not yet reached the facing position, and that the obtained image is not the white reference image.

When the control module 151 determines that the obtained image is not the white reference image, and more specifically, the control module 151 determines that any white reference image is not detected, the control module 151 returns the processing back to step S108, and repeats the processing in steps S108 to 5109.

On the other hand, when the control module 151 determines that the obtained image is the white reference image, and more specifically, the control module 151 determines that the white reference image is detected, the control module 151 stops the driving of the backing driving device 231 (step S110). It should be noted that the control module 151 stops the driving of the backing driving device 231 by shutting off supply of electric power to the backing driving device 231. The backing driving device 231 is connected to an electric current supply circuit (not shown), and the backing driving device 231 is driven when an electric current is supplied from the electric current supply circuit. The control module 151 shuts off supply of electric power to the backing driving device 231 by commanding the electric current supply circuit stop supply of electric current to the backing driving device 231. As described above, even when supply of electric current to the backing driving device 231 is shut off, the cam 207 is stopped and the backing 204 is held at the facing position.

Subsequently, the control module 151 determines that the position of the backing 204 where the white reference image is detected is the facing position (step S111), and terminates the series of steps.

As described above, the control module 151 once moves the backing 204 to the non-facing position side and then moves the backing 204 to the facing position side in order to detect the white reference image. As a result, even when vibration, shock, etc., is applied to the document conveying apparatus 100, and the position of the backing 204 is slightly changed, the white reference image is detected all over again, and therefore, the backing 204 can be set at the facing position with a high degree of precision.

Alternatively, in step S103, the control module 151 may drive the backing driving device 231 by a first driving quantity defined in advance, and the processing in steps 5104 to 5106 may be omitted. The first driving quantity is defined to be such a quantity that, when the backing 204 exits at the facing position, the backing 204 moves from the facing position but does not move to the non-facing position.

Figure 12:
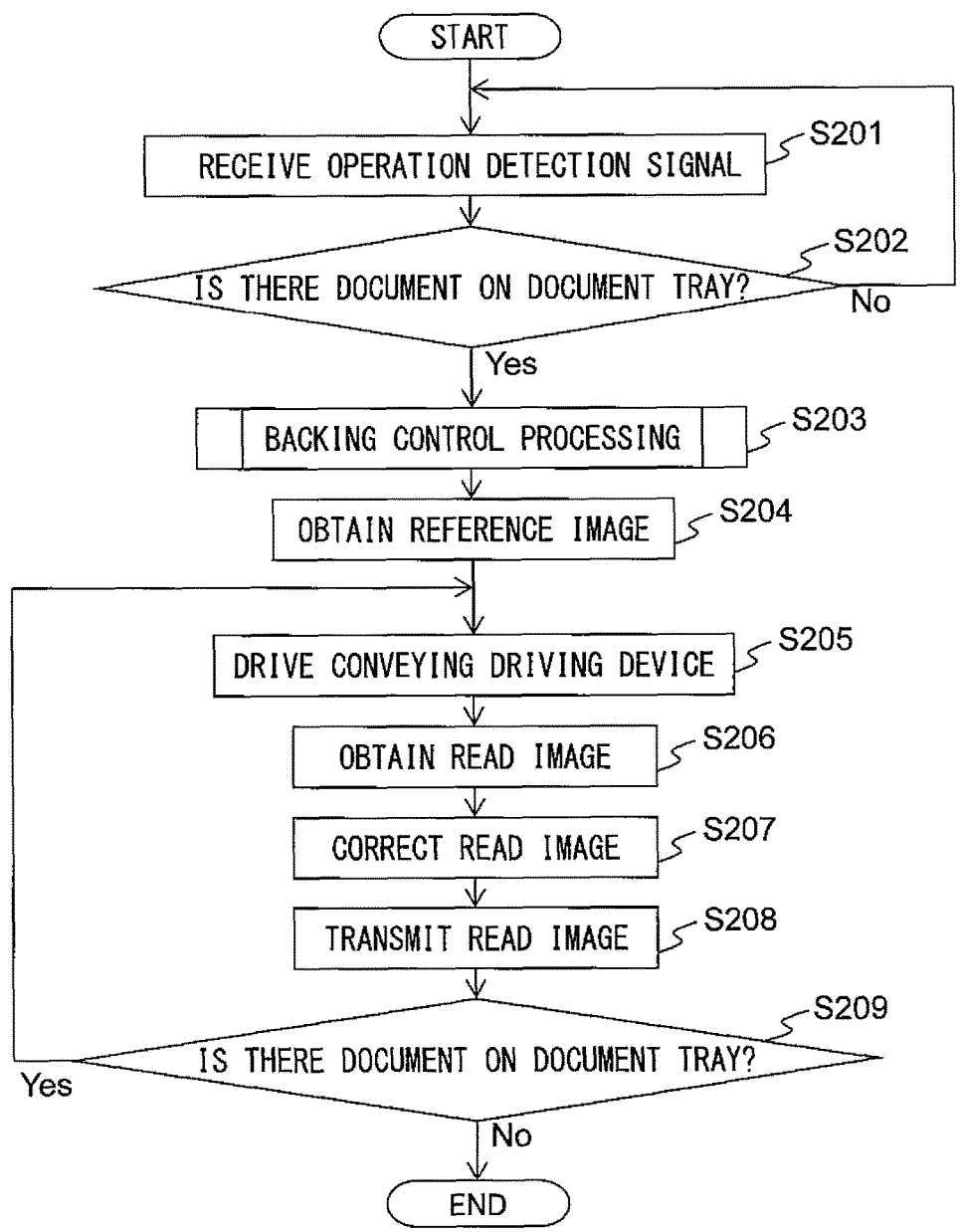
FIG. 12 is a flow chart illustrating an example of an operation of document reading processing.

FIG. 12 is a flow chart illustrating an example of an operation of document reading processing of the document conveying apparatus 100.

Hereinafter, an example of an operation of the entire processing of the document conveying apparatus 100 will be explained with reference to the flow chart as depicted in FIG. 12. It should be noted that the flow of the operation explained below is executed mainly by the CPU 150 in cooperation with each element of the document conveying apparatus 100 based on a program stored in the storage 143 in advance.

First, the control module 151 waits until the user presses down the operation button 106 for commanding reading of a document, and the control module 151 receives an operation detection signal commanding reading of a document from the operation button 106 (step S201).

Subsequently, the control module 151 determines whether a document is placed on the document tray 103 or not based on a first document detection signal received from the contact sensor 111 (step S202).

When a document is not placed on the document tray 103, the control module 151 returns the processing back to step S201, and waits until a new operation detection signal is received from the operation button 106.

On the other hand, when a document is placed on the document tray 103, the control module 151 executes the backing control processing (step S203). In the backing control processing, the control module 151 performs switch control of the backing 204 with the backing driving device 231. In other words, the control module 151 controls the backing driving device 231 to move the light reflecting surface. The details of the backing control processing will be explained later.

Subsequently, the image generator 152 causes the image capturing device 119 to read the backing 204 or the wall portion 205. Then, the image generator 152 obtains the white reference image or the black reference image via the A/D converter 140 (step S204).

Subsequently, the control module 151 drives the conveying driving device 141 to rotate the feeding roller 112, the brake roller 113, the first conveying roller 116, and the second conveying roller 121 and conveys a document (step S205).

Subsequently, the image generator 152 causes the image capturing device 119 to read the conveyed document, and obtains the read image via the A/D converter 140 (step S206).

Subsequently, the image generator 152 executes shading compensation on the read image by using the reference image (step S207). It should be noted that the shading compensation processing may be omitted.

Subsequently, the image generator 152 transmits the read image to an information processing apparatus, not shown, via the interface 142 (step S208). When the information processing apparatus is not connected, the image generator 152 stores the read image to the storage 143.

Subsequently, the control module 151 determines whether any document is remaining on the document tray 103 based on the first document detection signal received from the contact sensor 111 (step S209).

When a document is remaining on the document tray 103, the control module 151 returns the processing back to step S205, and repeats the processing in steps S205 to 5209. It should be noted that the control module 151 may return the processing back to step S204, and every time a single document is conveyed, the control module 151 may obtain the reference image again. On the other hand, when any document is not remaining on the document tray 103, the control module 151 terminates the series of processing.

Figure 13:
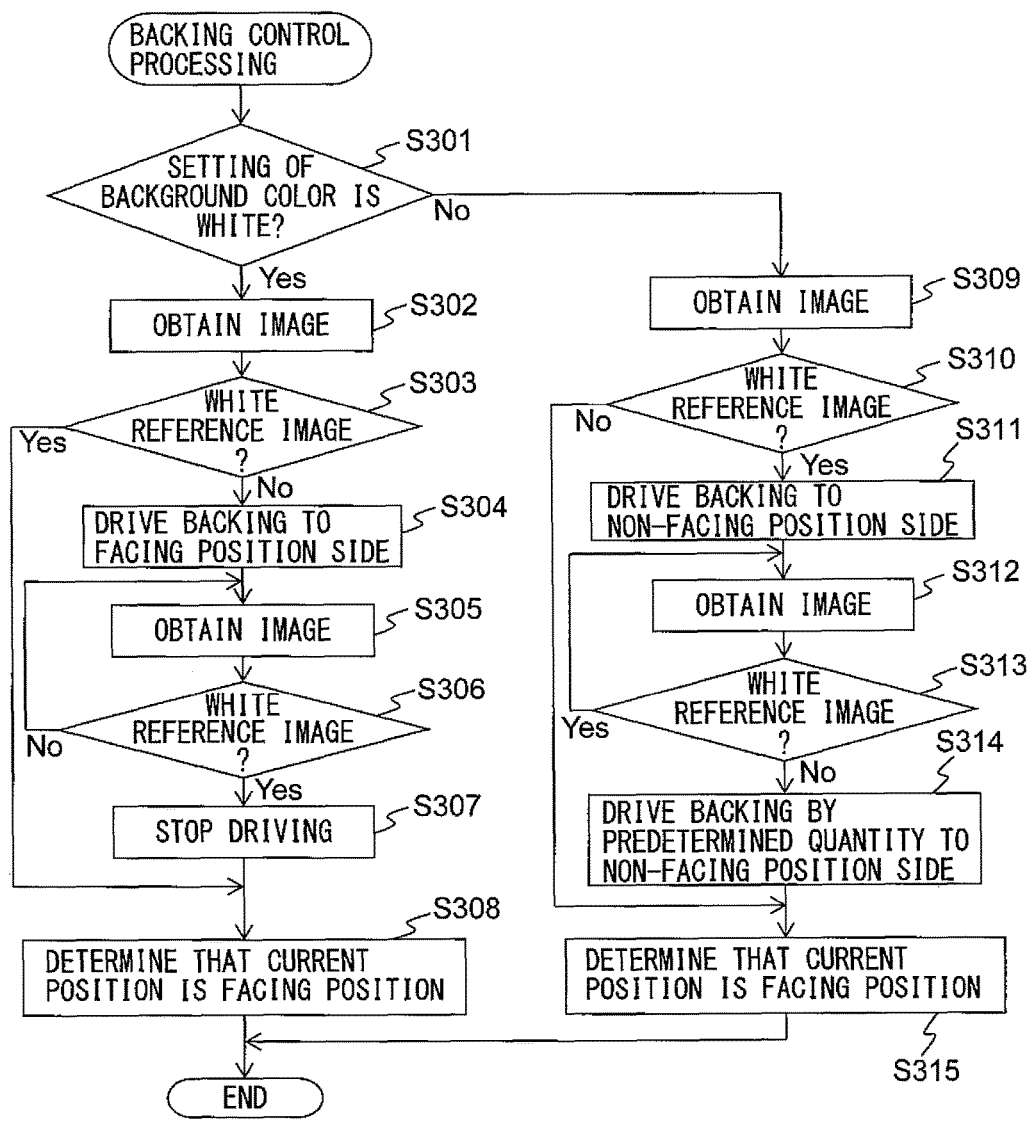
FIG. 13 is a flow chart illustrating an example of an operation of backing control processing.

FIG. 13 is a flow chart illustrating an example of an operation of backing control processing.

The flow of the operation as depicted in FIG. 13 is executed in step S203 in the flow chart as depicted in FIG. 12.

First, the control module 151 determines whether the background color of the document is set to white color or is set to black color (step S301). The background color of the document is set by the user in advance by using the operation button 106 and stored to the storage 143. The control module 151 reads the setting of the background color of the document from the storage 143, and determines whether the background color of the document is set to white color or set to black color.

When the background color of the document is set to white color, the control module 151 obtains the image, which is read by the image capturing device 119, via the A/D converter 140 (step S302).

Subsequently, the control module 151 determines whether the obtained image is the white reference image obtained by capturing the image of the facing surface 206 of the backing 204 in the same manner as step S102 (step S303).

When the control module 151 determines that the obtained image is the white reference image, the control module 151 determines that the current position of the backing 204 is the facing position (step S308), and terminates the series of steps. In other words, the control module 151 determines the facing position (the first position) based on the image obtained by the image capturing device 119.

On the other hand, when the control module 151 determines that the obtained image is not the white reference image, the control module 151 drives the backing driving device 231 to rotate the backing driving device 231 forward, and more specifically, the control module 151 drives the backing driving device 231 to rotate the backing 204 from the non-facing position side to the facing position side (step S304).

Subsequently, the control module 151 obtains the image, which is read by the image capturing device 119, via the A/D converter 140 (step S305).

Subsequently, the control module 151 determines whether the obtained image is the white reference image or not in the same manner as step S109 (step S306).

When the control module 151 determines that the obtained image is not the white reference image, and more specifically, the control module 151 determines that the white reference image is not detected, the control module 151 returns the processing back to step S305, and repeats the processing in steps 5305 to 5306.

On the other hand, when the control module 151 determines that the obtained image is the white reference image, and more specifically, the control module 151 determines that the white reference image is detected, the control module 151 stops the driving of the backing driving device 231 (step S307).

Subsequently, the control module 151 determines that the position of the backing 204 where the white reference image is detected is the facing position (step S308), and terminates the series of steps.

On the other hand, when the background color of the document is set to black color in step S301, the control module 151 obtains the image, which is read by the image capturing device 119, via the A/D converter 140 (step S309).

Subsequently, the control module 151 determines whether the obtained image is the white reference image obtained by capturing the image of the facing surface 206 of the backing 204 in the same manner as step S102 (step S310).

When the control module 151 determines that the obtained image is not the white reference image, the control module 151 determines that the current position of the backing 204 is the non-facing position (step S315), and terminates the series of steps.

On the other hand, when the control module 151 determines that the obtained image is the white reference image, the control module 151 drives the backing driving device 231 so as to rotate the backing driving device 231 backward, and more specifically, the control module 151 drives the backing driving device 231 so as to rotate the backing 204 from the facing position side to the non-facing position side (step S311).

Subsequently, the control module 151 obtains the image, which is read by the image capturing device 119, via the A/D converter 140 (step S312).

Subsequently, the control module 151 determines whether the obtained image is the white reference image in the same manner as step S102 (step S313). It should be noted that the control module 151 may further determine whether a difference between the average value of the gray level values calculated from the obtained image and the average value of the gray level values calculated from the image obtained immediately before is less than a threshold value. When the calculated difference is less than the threshold value, the control module 151 determines that the backing 204 has not yet rotated, and has not yet reached the facing position, and that the obtained image is not the white reference image.

When the control module 151 determines that the obtained image is the white reference image, the control module 151 returns the processing back to step S312, and repeats the processing in steps S312 to S313.

On the other hand, when the control module 151 determines that the obtained image is not the white reference image, the control module 151 deems that the current position of the backing 204 is the facing position. Then, the control module 151 drives the backing driving device 231 by the second driving quantity so as to further rotate the backing 204 from that position to the non-facing position side, and stops the driving of the backing driving device 231 (step S314). The second driving quantity is defined to be a quantity which is more than the first driving quantity and is such a quantity that, when the backing 204 exits at the facing position, the backing 204 moves to the non-facing position.

When the obtained image is the white reference image in step S310, the position of the backing 204 is considered to be the facing position where the white reference image is detected in step S111 or S308. However, after the white reference image is detected in step S111 or S308, vibration, shock, etc., may be applied to the document conveying apparatus 100, and the current position of the backing 204 may be changed. Therefore, in steps S312 to S314, by detecting the facing position where the white reference image is detected again, the detection precision of the facing position can be improved.

As described above, even when supply of electric power to the backing driving device 231 is shut off, the cam 207 is stopped by the force of the spring, and the backing 204 is held at the non-facing position.

Subsequently, the control module 151 determines that the current position of the backing 204 is the non-facing position (step S315), and terminates the series of steps. The current position of the backing 204 is a position obtained by driving the backing driving device 231 by the second driving quantity from the position where the white reference image is detected and moves the backing 204 by a predetermined quantity. In other words, the control module 151 determines the non-facing position (the second position) by moving the backing 204 (the light reflecting surface) by a predetermined quantity from the facing position (the first position).

When the backing driving device 231 is driven by the second driving quantity in step S315, the control module 151 may obtain the image which is read by the image capturing device 119, and determine whether the obtained image has changed from the white reference image or not. When the obtained image has not changed from the white reference image, the control module 151 determines that an abnormality occurs in the driving mechanism of the backing driving device 231 or the backing 204, and notifies the abnormality to the user.

Even in a case where the obtained image is the white reference image in step S303, vibration, shock, etc., may have been applied to the document conveying apparatus 100, and the backing 204 may not be the facing positon. Therefore, when the obtained image is the white reference image, the control module 151 may adjust the position of the backing 204 again by executing the processing in steps S103 to S111 of FIG. 11 instead of determining that the current position of the backing 204 is the facing position. Therefore, the detection precision of the facing position can be further improved.

Likewise, even in a case where the obtained image is not the white reference image in step S310, vibration, shock, etc., may have been applied to the document conveying apparatus 100, and the backing 204 may not be the non-facing positon. Therefore, when the obtained image is not the white reference image, the control module 151 may adjust the position of the backing 204 again instead of determining that the current position of the backing 204 is the non-facing position. In this case, the control module 151 executes the processing in steps S103 to S111 of FIG. 11 and moves the backing 204 to the facing position, and then executes the processing in steps S311 to S315 of FIG. 13 and moves the backing 204 to the facing position. Therefore, the non-detection precision of the facing position can be further improved.

Figure 14:
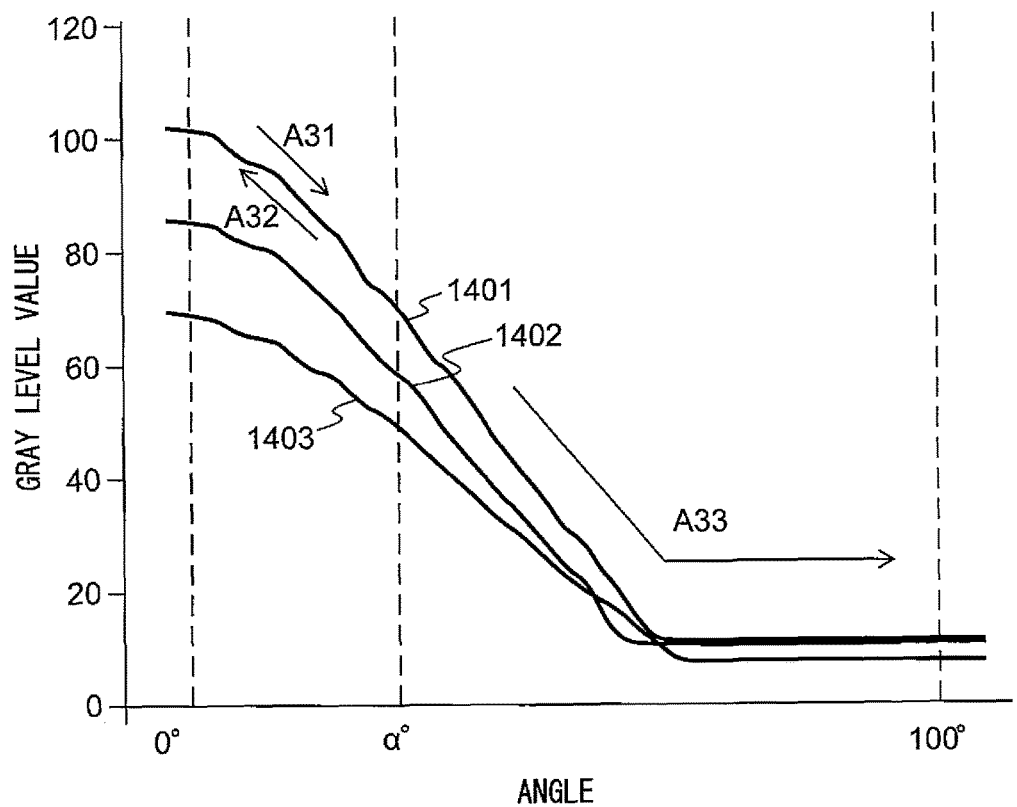
FIG. 14 is a graph illustrating a relationship of an angle of a backing and a gray level value of an obtained image.

FIG. 14 is a graph illustrating an example of a relationship of the angle of the backing and the gray level value of the obtained image.

The horizontal axis of FIG. 14 indicates the angle of the facing surface 206 of the backing 204 with respect to the glass surface 201. The vertical axis of FIG. 14 indicates the average value of the gray level values of each color component of RGB of each pixel in a predetermined area of an obtained image. More specifically, in FIG. 13, an angle of 0 degrees corresponds to the facing position, and an angle of 100 degrees corresponds to the non-facing position. A graph 1401 indicates the average value of the gray level values of the G component, a graph 1402 indicates the average value of the gray level values of the R component, and a graph 1403 indicates the average value of the gray level values of the B component.

Hereinafter, how each processing as depicted in FIGS. 11, 13 is executed will be explained with reference to FIG. 3 to FIG. 5, FIGS. 7A to 7C, FIGS. 8A to 8C, and FIG. 14.

First, the processing for moving the backing 204 to the facing position as depicted in steps S101 to S111 of FIG. 11 will be explained.

As depicted in FIG. 3, when the backing 204 is set at the facing position, the cam 207 and the transmission member 235 are set in the state as depicted in FIG. 7A. The average value of the gray level values of each color component of the image obtained in that case is a value at an angle of zero degrees as depicted in FIG. 14.

When the backing driving device 231 is driven from this state in the same manner as step S103 of FIG. 11, the transmission member 235 ascends as depicted in FIG. 7B, and the cam 207 is rotate in the directions of the arrows A15, A16. In this case, the backing 204 pivots to the non-facing position side (the directions of the arrows A7, A8 as depicted in FIG. 4). The average value of the gray level values of each color component of the obtained image changes in the direction of the arrow A31 as depicted in FIG. 14, and attains a value at the angle α degrees (0<α<100).

When the backing driving device 231 is driven from this state in the same manner as step S107 of FIG. 11, the transmission member 235 descends as depicted in FIG. 8B, the cam 207 is rotated in the directions of the arrows A25, A26. In this case, the backing 204 rotates to the facing position side (the directions opposite to the arrows A7, A8 as depicted in FIG. 4), and attains the facing position as depicted in FIG. 3. The average value of the gray level values of each color component of the obtained image changes in the direction of the arrow A32 as depicted in FIG. 14, and when the average value attains a value at the angle of zero degrees, the white reference image is detected in step S109 of FIG. 11.

Subsequently, the processing for moving the backing 204 to the non-facing position as depicted in steps S309 to 5315 of FIG. 13 will be explained.

When the backing driving device 231 is driven from the state as depicted in FIG. 3 in the same manner as step S311 of FIG. 13, the transmission member 235 ascends as depicted in FIG. 7A, and the transmission member 235 comes into contact with the cam 207. Thereafter, when the transmission member 235 is further raised, the backing 204 rotates to the non-facing position side (the directions of the arrows A7, A8 as depicted in FIG. 4). The average value of the gray level values of each color component of the obtained image changes in the direction of the arrow A31 as depicted in FIG. 14, and when the average value becomes less than the value at the angle of zero degrees, the image obtained in step S313 of FIG. 13 is determined not to be the white reference image.

When the backing driving device 231 is driven from this state in the same manner as step S314 of FIG. 13, the transmission member 235 further ascends as depicted in FIG. 7B, and the cam 207 rotates in the directions of the arrows A15, A16, and attains the state as depicted in FIG. 7C. In this case, the backing 204 rotates to the non-facing position side (the directions of the arrows A7, A8 as depicted in FIG. 4), and reaches the non-facing position as depicted in FIG. 5. The average value of the gray level values of each color component of the obtained image changes in the direction of the arrow A33 as depicted in FIG. 14, and attains a value at an angle of 100 degrees.

In the document conveying apparatus 100, the lens focal point of the image capturing device 119 is adjusted to the glass surface 201 so that the image of the conveyed document can be captured in a preferable manner. Since the facing surface 206 of the backing 204 is close to the glass surface 201, the image obtained by capturing the image of the facing surface 206 of the backing 204 is an image in which the focal point is not deviated, and the image capturing device 119 can detect the white reference image with a high degree of precision.

On the other hand, since the wall portion 205 is away from the glass surface 201, the image obtained by capturing the image of the wall portion 205 is an image in which the focal point is deviated. When the backing 204 is farther from the glass surface 201, the image captured by the image capturing device 119 gradually becomes darker, and even if the backing 204 does not reach the non-facing position, the color of the captured image becomes sufficiently close to black color. The relationship between the position of the backing 204 at that occasion and the degree as to how much the captured image becomes close to black color varies depending on apparatuses. Therefore, the image capturing device 119 may not be able to detect the black reference image with a high degree of precision.

Therefore, when the backing 204 is set to the non-facing position, the document conveying apparatus 100 moves the backing 204 to the facing position where the white reference image is detected, and then moves the backing 204 by the predetermined quantity to the non-facing position side. Therefore, the document conveying apparatus 100 can set the backing 204 to the non-facing position with a high degree of precision.

Subsequently, the processing for moving the backing 204 to the facing position as depicted in steps S302 to S308 of FIG. 13 will be explained.

When the backing 204 is set to the non-facing position as depicted in FIG. 5, the cam 207 and the transmission member 235 are set in the state as depicted in FIG. 8A. The average value of the gray level values of each color component of the image obtained at that occasion is a value at an angle of 100 degrees as depicted in FIG. 14.

When the backing driving device 231 is driven from this state in the same manner as step S304 of FIG. 13, the transmission member 235 descends as depicted in FIG. 8B, the cam 207 is rotated in the directions of the arrows A25, A26. In this case, the backing 204 rotates to the facing position side (the directions opposite to the arrows A7, A8 as depicted in FIG. 4), and attains the facing position as depicted in FIG. 3. The average value of the gray level values of each color component of the obtained image changes in the direction of the arrow A32 as depicted in FIG. 14, and when the average value attains a value at the angle of zero degrees, the white reference image is detected in step S306 of FIG. 13.

As described above, since the image capturing device 119 can detect the white reference image with a high degree of precision, the document conveying apparatus 100 can set the backing 204 to the facing position with a high degree of precision.

As described above in details, the document conveying apparatus 100 determines the facing position of the backing 204 based on the image captured by the image capturing device 119, and determines the non-facing position based on the movement quantity from the determined facing position. Therefore, the document conveying apparatus 100 can set the backing 204 to an appropriate position without using any position sensor for detecting the position of the backing, a spring for changing the position of the backing in accordance with the driving of the motor, or the like. Further, even when vibration, shock, etc., is applied and the current position of the backing 204 is changed, the document conveying apparatus 100 can accurately move the backing 204 to the facing position or the non-facing position. Therefore, the document conveying apparatus 100 can set the backing 204 to an appropriate position with a high degree of precision while alleviating the increase in the apparatus size and the cost.

When the backing 204 is rotated to the facing position, the document conveying apparatus 100 brings the contact portions 240a, 240b of the transmission member 235 into contact with the contacted portion 239a of the first cam 207a and the contacted portion 239b of the second cam 207b, whereby the backing 204 is held. Therefore, when the backing 204 is held at the facing position, the document conveying apparatus 100 can alleviate the increase in the electric power consumed by continuously driving the motor.

According to the image reading apparatus, the image reading apparatus determines the position where the light reflecting surface reflects light from the light source based on the image captured by the image capturing module for capturing the image of the document, and determines a position, which is not the position thus determined, based on the movement quantity from the determined position. Therefore, the image reading apparatus can set the light reflecting surface to an appropriate position with a high degree of precision while alleviating the increase in the apparatus size and the cost.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present inventions have been described in detail, it should be understood that the various changes, substitutions, and alterations could be made hereto without departing from the spirit and scope of the invention.

What is claimed is:

1. An image reading apparatus comprising:
    an image capturing device for capturing an image of a document;
    a light source;
    a movable light reflecting surface having a white color;
    a driving device for moving the light reflecting surface between a first position at which the light reflecting surface reflects light from the light source and a second position at which the light reflecting surface does not reflect light from the light source; and
    a control circuit for controlling the driving device to move the light reflecting surface,
    wherein the control circuit determines whether an image obtained by the image capturing device is a white reference image and determines, as the first position, a position where the white reference image is detected when the control circuit moves the light reflecting surface from the second position to the first position; and determines, as the second position, a position where the light reflecting surface is moved by a predetermined distance from the first position without using an image obtained by the image capturing device, when the control circuit moves the light reflecting surface from the first position to the second position.

2. The image reading apparatus according to claim 1, wherein the control circuit once moves the light reflecting surface to the second position and then moves the light reflecting surface to the first position to detect the white reference image.

3. The image reading apparatus according to claim 2, wherein the control circuit detects the white reference image based on an average value of a color component of pixels in a predetermined area of the image obtained by the image capturing device.

4. An image reading method for an image reading apparatus including an image capturing device for capturing an image of a document, a light source, a movable light reflecting surface having a white color, and a driving device for moving the light reflecting surface, the image reading method comprising:
    controlling the driving device to move the light reflecting surface between a first position at which the light reflecting surface reflects light from the light source and a second position at which the light reflecting surface does not reflect light from the light source;
    determining whether an image obtained by the image capturing device is a white reference image and determining, as the first position, a position where the white reference image is detected when the light reflecting surface is moved from the second position to the first position; and
    determining, as the second position, a position where the light reflecting surface is moved by a predetermined distance from the first position without using an image obtained by the image capturing device, when the light reflecting surface is moved from the first position to the second position.

5. A computer-readable, non-transitory medium storing a computer program, wherein the computer program causes a computer which comprises an image capturing device for capturing an image of a document, a light source, a movable light reflecting surface having a white color, and a driving device for moving the light reflecting surface, to execute a process, the process comprising:
    controlling the driving device to move the light reflecting surface between a first position at which the light reflecting surface reflects light from the light source and a second position at which the light reflecting surface does not reflect light from the light source;
    determining whether an image obtained by the image capturing device is a white reference image and determining, as the first position, a position where the white reference image is detected when the light reflecting surface is moved from the second position to the first position; and
    determining, as the second position, a position where the light reflecting surface is moved by a predetermined distance from the first position without using an image obtained by the image capturing device, when the light reflecting surface is moved from the first position to the second position.

6. The computer-readable, non-transitory medium according to claim 5, wherein the light reflecting surface is moved to the second position and then moved to the first position to detect the white reference image.

7. The computer-readable, non-transitory medium according to claim 6, wherein the white reference image is detected based on an average value of a color component of pixels in a predetermined area of the image obtained by the image capturing device.

8. The image reading method according to claim 4, wherein the light reflecting surface is moved to the second position and then moved to the first position to detect the white reference image.

9. The image reading method according to claim 8, wherein the white reference image is detected based on an average value of a color component of pixels in a predetermined area of the image obtained by the image capturing device.

* * * * *